United States Patent
Lim et al.

(10) Patent No.: US 11,616,976 B2
(45) Date of Patent: Mar. 28, 2023

(54) VIDEO ENCODING/DECODING METHOD AND DEVICE, AND RECORDING MEDIUM STORING BIT STREAM

(71) Applicant: Electronics and Telecommunications Research Institute, Daejeon (KR)

(72) Inventors: Sung Chang Lim, Daejeon (KR); Jung Won Kang, Daejeon (KR); Hyun Suk Ko, Daejeon (KR); Dong San Jun, Daejeon (KR); Jin Ho Lee, Daejeon (KR); Ha Hyun Lee, Seoul (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/620,545

(22) PCT Filed: Jun. 5, 2018

(86) PCT No.: PCT/KR2018/006401
§ 371 (c)(1),
(2) Date: Dec. 9, 2019

(87) PCT Pub. No.: WO2018/226015
PCT Pub. Date: Dec. 13, 2018

(65) Prior Publication Data
US 2020/0280735 A1    Sep. 3, 2020

(30) Foreign Application Priority Data

Jun. 9, 2017   (KR) .................. 10-2017-0072292
Jul. 21, 2017  (KR) .................. 10-2017-0092607

(51) Int. Cl.
H04N 19/523   (2014.01)
H04N 19/176   (2014.01)
(Continued)

(52) U.S. Cl.
CPC ......... *H04N 19/523* (2014.11); *H04N 19/176* (2014.11); *H04N 19/124* (2014.11); *H04N 19/13* (2014.11)

(58) Field of Classification Search
CPC .. H04N 19/523; H04N 19/176; H04N 19/124; H04N 19/13; H04N 19/51; H04N 19/122
See application file for complete search history.

(56) References Cited

U.S. PATENT DOCUMENTS 5,973,754 A * 10/1999 Panis .................. G06T 7/277
                                                 348/699
2011/0080954 A1    4/2011 Bossen et al.
(Continued)

FOREIGN PATENT DOCUMENTS

CN    105532004 A    4/2016
KR    10-0772576 B1   11/2007
(Continued)

OTHER PUBLICATIONS

International Search Report dated Sep. 12, 2018 in counterpart International Patent Application No. PCT/KR2018/006401 (2 pages in English and 2 pages in Korean).
(Continued)

*Primary Examiner* — Joseph W Becker
(74) *Attorney, Agent, or Firm* — NSIP Law

(57) ABSTRACT

Disclosed is an image encoding method. The method includes deriving a motion refinement candidate from among motion information of spatial neighboring blocks, motion information of a temporal neighboring blocks, predefined motion information, and motion information that most frequently occurs in a reference picture, performing a motion information refinement on the derived motion refinement candidate, and generating a prediction block of a
(Continued)

| merge candidate index (merge_idx) | L0 motion information | | | L1 motion information | | | L2 motion information | | | L3 motion information | | | description |
|---|---|---|---|---|---|---|---|---|---|---|---|---|---|
| | motion vector | reference picture index | prediction list utilization flag | motion vector | reference picture index | prediction list utilization flag | motion vector | reference picture index | prediction list utilization flag | motion vector | reference picture index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| ... | | | | | | | | | | | | | | when MaxNumMergeCand is 7 numMergeCand = 5 current block by using the motion refinement candidate having undergone the motion information refinement.

9 Claims, 14 Drawing Sheets

(51) Int. Cl.
*H04N 19/124* (2014.01)
*H04N 19/13* (2014.01)

(56) References Cited

U.S. PATENT DOCUMENTS

| | | |
|---|---|---|
| 2014/0037004 A1 | 2/2014 | Jeong et al. |
| 2015/0078451 A1 | 3/2015 | Tourapis et al. |
| 2016/0191915 A1 | 6/2016 | Lim et al. |
| 2016/0286230 A1 | 9/2016 | Li et al. |
| 2016/0286232 A1 | 9/2016 | Li et al. |
| 2017/0085906 A1 | 3/2017 | Chen et al. |
| 2017/0238005 A1* | 8/2017 | Chien ............... H04N 19/176 375/240.16 |
| 2018/0249154 A1* | 8/2018 | Chuang ............... H04N 19/105 |
| 2020/0351505 A1* | 11/2020 | Seo ............... H04N 19/159 |
| 2021/0092439 A1* | 3/2021 | Ikai ............... H04N 19/533 |

FOREIGN PATENT DOCUMENTS

| | | |
|---|---|---|
| WO | WO 01/86962 A1 | 11/2001 |
| WO | WO 2017/036414 A1 | 3/2017 |
| WO | WO 2017/084512 A1 | 5/2017 |

OTHER PUBLICATIONS

Kamp, Steffen et al. "Description of video coding technology proposal by RWTH Aachen University" *Joint Collaborative Team on Video Coding (JCT-VC) of ITU-T SG16 WP3 and ISO/IEC JTC/SC29/WG11 1$^{st}$ Meeting*: Dresden, DE, Apr. 15-23, 2010 (23 pages in English).

Kamp, Steffen et al. "Decoder-side motion vector derivation for block-based video coding." *IEEE transactions on circuits and systems for video technology* 22.12 (2012): 1732-1745. (23 pages in English).

Chen, Jianle et al. "Algorithm Description of Joint Exploration Test Model 6 (JEM 6)" *Joint Video Exploration Team (JVET) of ITU-T SG 16 WP 3 and ISO/IEC JTC 1/SC 29/WG 11 6$^{th}$ Meeting*: Hobart, AU, Mar. 31-Apr. 7, 2017 (49 pages in English).

Li, Xiang et al. "Frame rate up-conversion based motion vector derivation for hybrid video coding." *2017 Data Compression Conference (DCC)*. IEEE, 2017. (10 pages in English).

* cited by examiner

FIG. 11

| merge candidate index (merge_idx) | L0 motion information | | | L1 motion information | | | L2 motion information | | | L3 motion information | | | description |
|---|---|---|---|---|---|---|---|---|---|---|---|---|---|
| | motion vector | reference picture index | prediction list utilization flag | motion vector | reference picture index | prediction list utilization flag | motion vector | reference picture index | prediction list utilization flag | motion vector | reference picture index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| ... | | | | | | | | | | | | | |
| numMergeCand = 4 | | | | | | | | | | | | | |

*when MaxNumMergeCand is 7*

FIG. 12

| merge candidate index (merge_idx) | L0 motion information | | | L1 motion information | | | L2 motion information | | | L3 motion information | | | description |
|---|---|---|---|---|---|---|---|---|---|---|---|---|---|
| | motion vector | reference picture index | prediction list utilization flag | motion vector | reference picture index | prediction list utilization flag | motion vector | reference picture index | prediction list utilization flag | motion vector | reference picture index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| ... | | | | | | | | | | | | | |
| numMergeCand = 5 | | | | | | | | | | | | | |

*when MaxNumMergeCand is 7*

VIDEO ENCODING/DECODING METHOD AND DEVICE, AND RECORDING MEDIUM STORING BIT STREAM

CROSS REFERENCE TO RELATED APPLICATIONS

This application is a U.S. National Stage Application of International Application No. PCT/KR2018/006401, filed on Jun. 5, 2018, which claims the benefit under 35 USC 119(a) and 365(b) of Korean Patent Application No. 10-2017-0072292, filed on Jun. 9, 2017 and Korean Patent Application No. 10-2017-0092607, filed on Jul. 21, 2017 in the Korean Intellectual Property Office, the entire disclosure of which is incorporated herein by reference for all purposes.

TECHNICAL FIELD

The present invention relates to a method and apparatus for encoding/decoding an image. Particularly, the present invention relates to a method and apparatus for performing motion compensation by refining motion information and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

Conventional image encoding/decoding methods and apparatuses have their limitations in improving coding efficiency because the conventional image encoding/decoding methods and apparatuses perform motion compensation based on motion information of spatial/temporal neighboring blocks adjacent to a current block (i.e., an encoding/decoding target block).

DETAILED DESCRIPTION OF THE INVENTION

Technical Problem

The present invention provides a method and apparatus being capable of performing motion compensation by refining motion information.

Technical Solution

A method of decoding an image according to the present invention, the method may comprise deriving a motion refinement candidate from among motion information of a spatial neighboring block, motion information of a temporal neighboring block, predefined motion information, and motion information that most frequently occurs in a reference picture, performing a motion information refinement on the derived motion refinement candidate, and generating a prediction block of a current block by using the motion refinement candidate having undergone the motion information refinement.

In the method of decoding an image according to the present invention, wherein the deriving of the motion information candidate is performed by sequentially deriving motion refinement candidates in a predetermined order, from among the motion information of the spatial neighboring block, the motion information of the temporal neighboring block, the defined motion information, and the motion information that most frequently occurs in the reference picture.

In the method of decoding an image according to the present invention, wherein the predetermined order represents order of the motion information of the spatial neighboring block, the motion information of the temporal neighboring block, and the defined motion information.

In the method of decoding an image according to the present invention, wherein the performing of the motion information refinement comprises a process of applying bilateral template matching on a motion vector that is present among the derived motion refinement candidates.

In the method of decoding an image according to the present invention, wherein the bilateral template matching comprises: generating a bilateral template by using the motion vector that is present among the derived motion refinement candidates as an initial motion vector, and refining the initial motion vector by comparing a sample within the bilateral template and a reconstructed sample indicated by the initial motion vector within the reference picture.

In the method of decoding an image according to the present invention, wherein the initial motion vector is a bidirectional prediction motion vector that is not a zero vector, among the derived motion refinement candidates.

In the method of decoding an image according to the present invention, wherein when there is no bidirectional prediction motion vector that is not a zero vector, among the derived motion refinement candidates, the initial motion vector is set to the zero vector.

In the method of decoding an image according to the present invention, wherein the temporal neighboring block is included in a reference picture selected by a reference picture index of the spatial neighboring block.

In the method of decoding an image according to the present invention, wherein the bilateral template matching is performed on an integer-pixel basis and a sub-pixel basis.

In the method of decoding an image according to the present invention, wherein the refining of the initial motion vector comprises: searching for a motion vector indicating a region in the reference picture, the region having a minimum distortion value with respect to a corresponding region in the bilateral template, and setting the found motion vector as a refined value of the initial motion vector.

In the method of decoding an image according to the present invention, wherein the searching for the initial motion vector comprises: searching a restricted search range within the reference picture.

In the method of decoding an image according to the present invention, wherein the restricted search range is set to a predetermined range demarcated on an integer-pixel basis.

In the method of decoding an image according to the present invention, wherein the searching for the initial motion vector comprises:

searching, on a sub-pixel basis, the predetermined range for a motion vector.

In the method of decoding an image according to the present invention, wherein the refining of the initial motion vector is recursively performed.

In the method of decoding an image according to the present invention, wherein the performing of the motion information refinement on the derived motion refinement candidate is performed when the current block corresponds to none of a unidirectional prediction merge candidate, a local illumination compensation mode, and an affine motion compensation mode.

In the method of decoding an image according to the present invention, further comprising: decoding motion-refined mode utilization information and determining a motion-refined mode based on the decoded motion-refined mode utilization information, wherein the deriving of the motion refinement candidate is performed in a motion-refined mode.

In the method of decoding an image according to the present invention, wherein the decoding of the motion-refined mode utilization information comprises: determining whether to decode the motion-refined mode utilization information based on a skip flag or a merge flag.

In the method of decoding an image according to the present invention, wherein when there are a plurality of spatial neighboring blocks, the deriving of the motion information candidate comprises deriving motion information from spatial neighboring blocks having a bidirectional prediction motion vector and subsequently from spatial neighboring blocks having a unidirectional prediction motion vector.

A method of encoding an image according to the present invention, the method may comprise deriving a motion refinement candidate from among motion information of a spatial neighboring block, motion information of a temporal neighboring block, predefined motion information, and motion information that most frequently occurs in a reference picture, performing a motion information refinement on the derived motion refinement candidate, and generating a prediction block of a current block by using the motion refinement candidate having undergone the motion information refinement.

A non-temporary storage medium containing a bit stream generated through an image encoding method comprising: deriving a motion refinement candidate from among motion information of a spatial neighboring block, motion information of a temporal neighboring block, predefined motion information, and motion information that most frequently occurs in a reference picture, performing a motion information refinement on the derived motion refinement candidate, and generating a prediction block of a current block by using the motion refinement candidate having undergone the motion information refinement.

Advantageous Effects

According to the present invention, an image encoding/decoding method and apparatus with improved compression efficiency can be provided.

According to the present invention, encoding and decoding efficiency of an image can be improved.

According to the present invention, the computational complexity of an image encoder and an image decoder can be reduced.

BRIEF DESCRIPTION OF THE INVENTION

FIG. 11 is a diagram illustrating an example in which a spatial merge candidate is added to a merge candidate list;

FIG. 12 is a diagram illustrating an example in which a temporal merge candidate is added to a merge candidate list;

PREFERRED EMBODIMENT OF THE INVENTION

Figure 1:
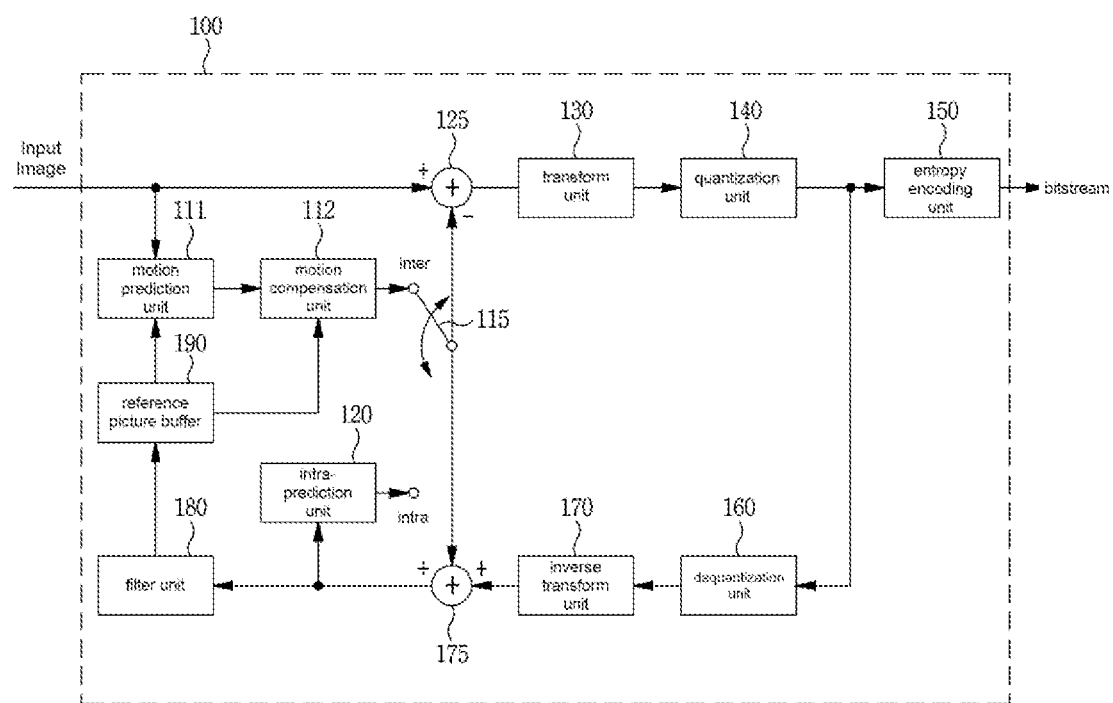
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd-1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
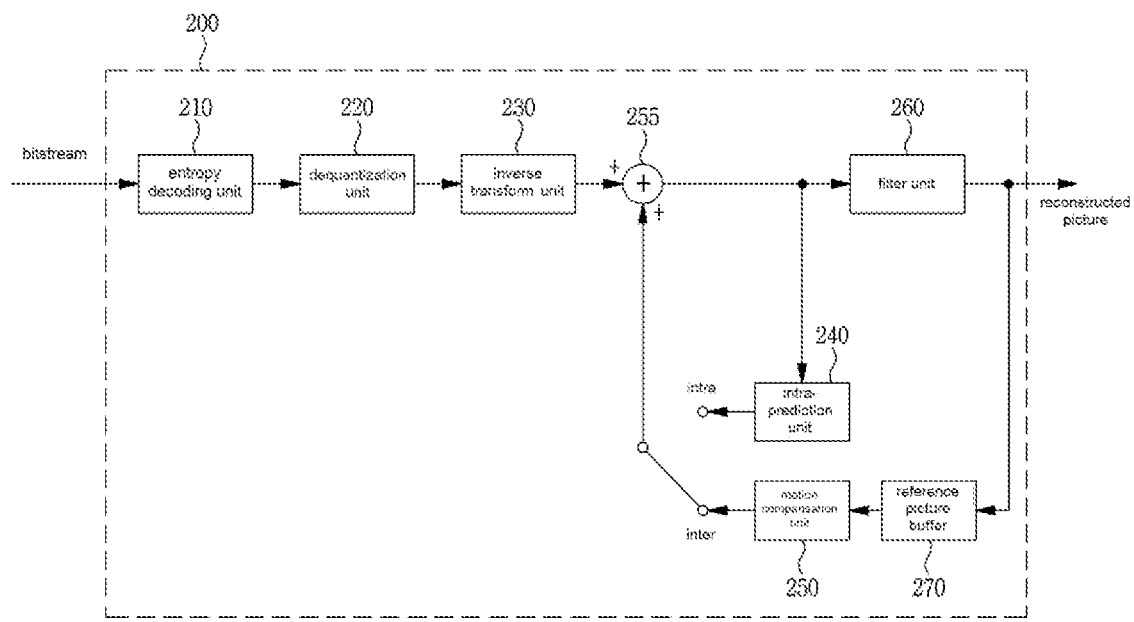
FIG. 2 is a block diagram showing configurations of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
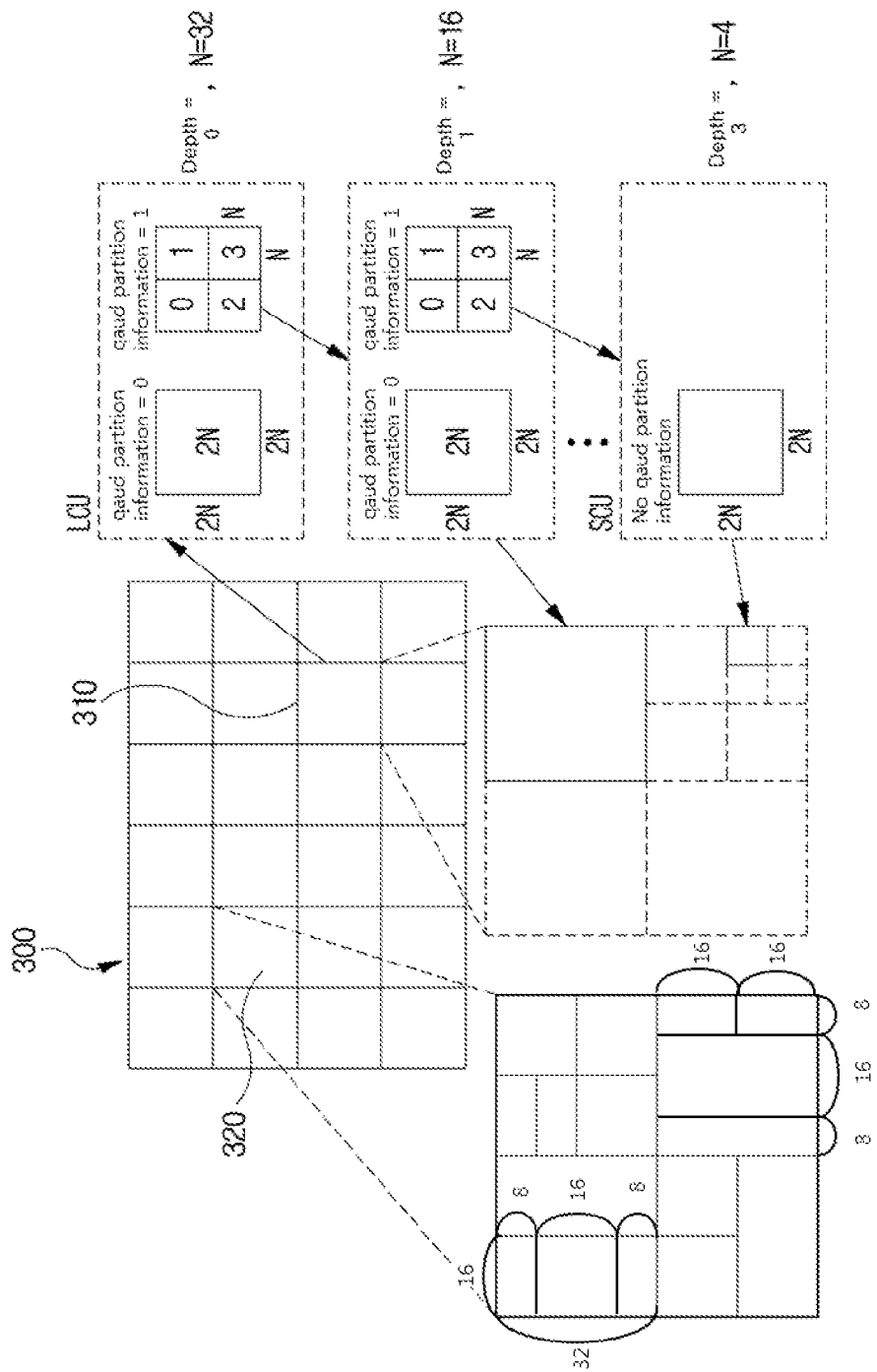
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
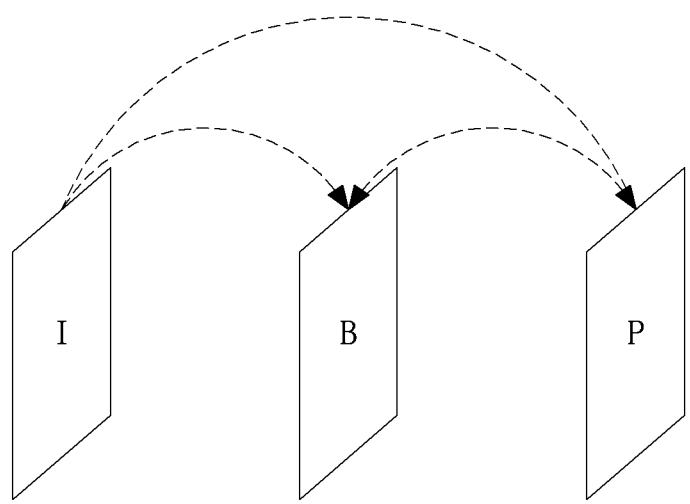
FIG. 4 is a view showing an inter-prediction process.

FIG. 4 is a diagram illustrating an embodiment of an inter-picture prediction process.

In FIG. 4, a rectangle may represent a picture. In FIG. 4, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Based on the above description, an image encoding method and an image decoding method according to embodiments of the present invention will be described in detail below.

Figure 5:
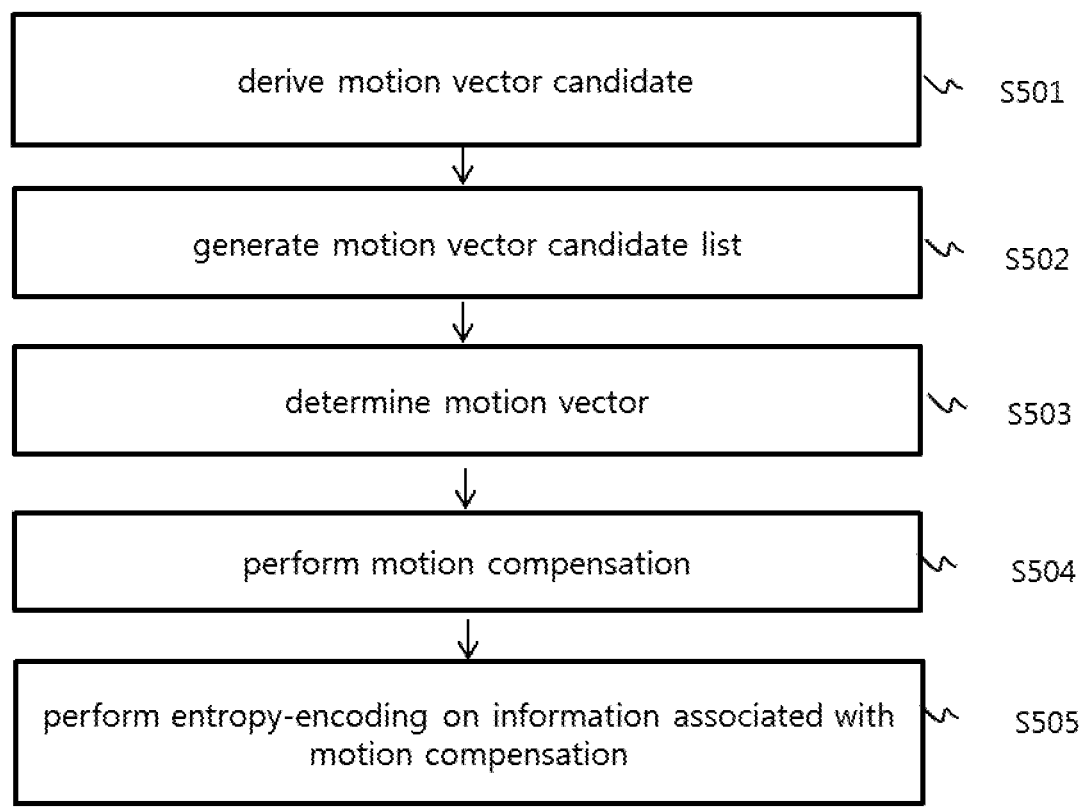
FIG. 5 is a flowchart illustrating an image encoding method according to one embodiment of the present invention.
Figure 6:
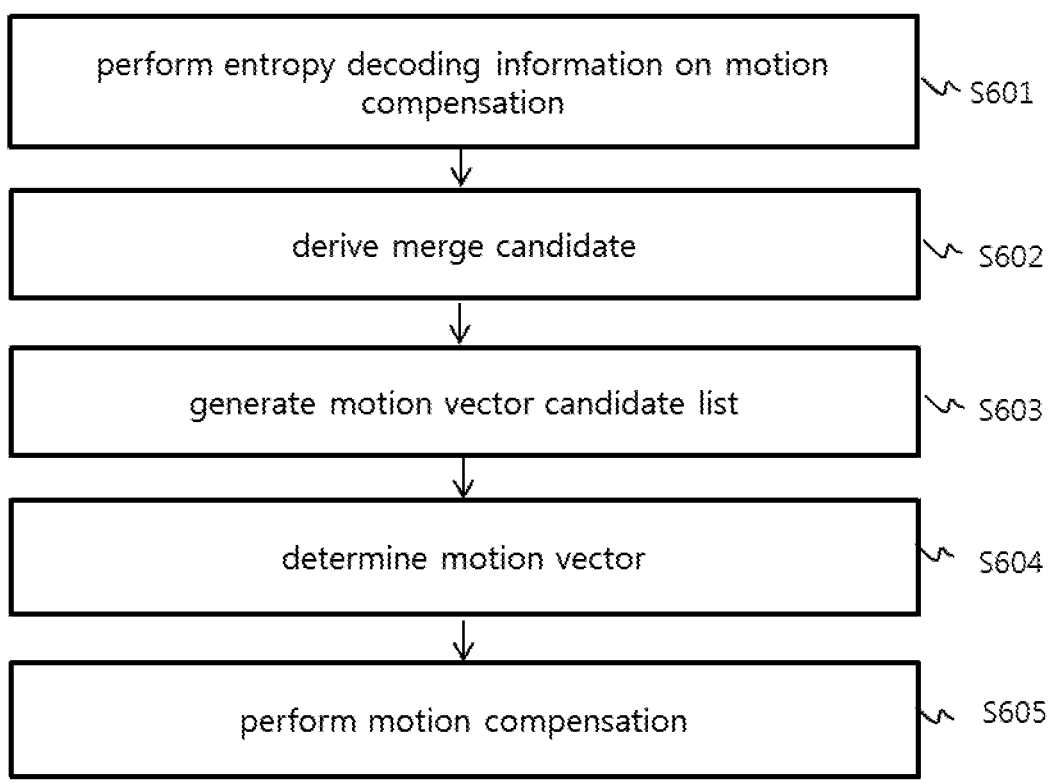
FIG. 6 is a flowchart illustrating an image decoding method according to one embodiment of the present invention.

FIG. 5 is a flowchart illustrating an image encoding method according to one embodiment of the present invention, and FIG. 6 is a flowchart illustrating an image decoding method according to one embodiment of the present invention.

Referring to FIG. 5, an encoding apparatus may derive motion vector candidates (Step S501) and generate a motion vector candidate list based on the derived motion vector candidates (Step S502). After the motion vector candidate list is generated, a motion vector may be determined based on the generated motion vector candidate list (Step S503), and motion compensation may be performed based on the determined motion vector (Step S504). Subsequently, the encoding apparatus may encode information associated with motion compensation (Step S505).

Referring to FIG. 6, a decoding apparatus may perform entropy decoding on the information associated with motion compensation received from the encoding apparatus (Step S601) and derive motion vector candidates (Step S602). The decoding apparatus may generate a motion vector candidate list based on the derived motion vector candidates (Step S603), and determine a motion vector using the generated motion vector candidate list (Step S604). Subsequently, the decoding apparatus may perform motion compensation by using the determined motion vector (Step S605).

Figure 7:
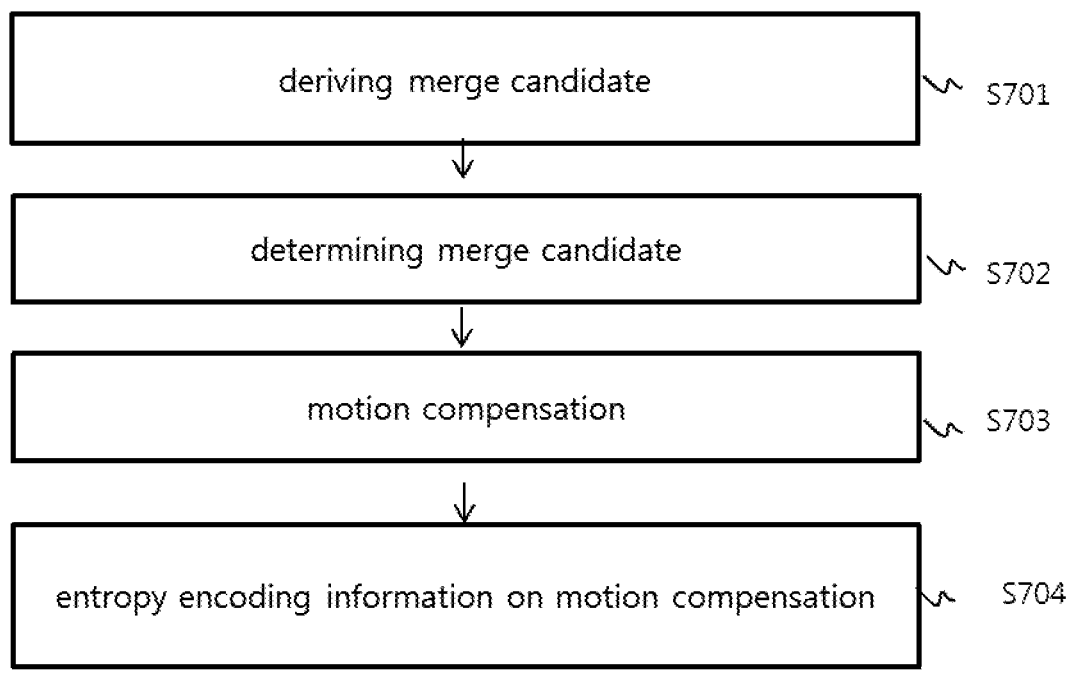
FIG. 7 is a flowchart illustrating an image encoding method according to another embodiment of the present invention.
Figure 8:
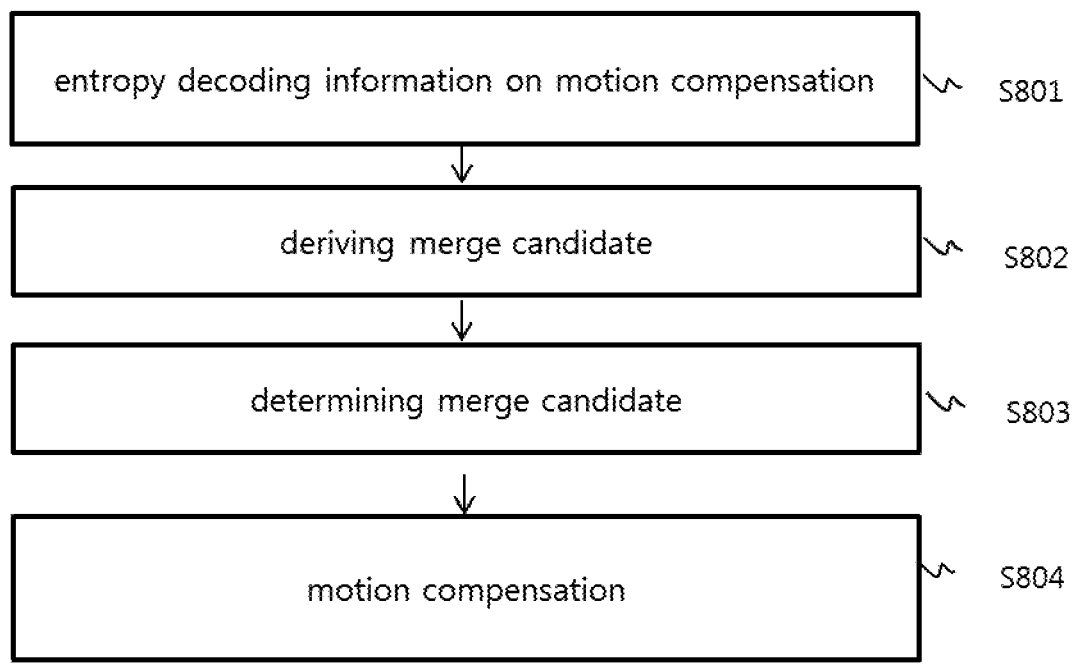
FIG. 8 is a flowchart illustrating an image decoding method according to another embodiment of the present invention.

FIG. 7 is a flowchart illustrating an image encoding method according to another embodiment of the present invention, and FIG. 8 is a flowchart illustrating an image decoding method according to another embodiment of the present invention.

Referring to FIG. 7, the encoding apparatus may derive merge candidates (Step S701) and generate a merge candidate list based on the derived merge candidates. After the merge candidate list is generated, the encoding apparatus may determine motion information using the generated merge candidate list (Step S702) and may perform motion compensation on a current block using the determined motion information (Step S703). Subsequently, the encoding apparatus may perform entropy encoding on information associated with the motion compensation (Step S704).

Referring to FIG. 8, the decoding apparatus may perform entropy decoding on the information associated with the motion compensation received from the encoding apparatus (S801), derive merge candidates (S802), and generate a merge candidate list based on the derived merge candidates. After the merge candidate list is generated, the decoding apparatus may determine motion information of the current block by using the generated merge candidate list (S803). Subsequently, the decoding apparatus may perform motion compensation using the motion information (S804).

FIGS. 5 and 6 illustrate an example in which an AMVP illustrated in FIG. 4 is applied, and FIGS. 7 and 8 illustrate an example in which a merge mode illustrated in FIG. 4 is applied.

Hereinafter, each step in FIGS. 5 and 6 will be described, and then each step in FIGS. 7 and 8 will be described. However, the motion compensation step corresponding to S504, S605, S703, and S804 and the entropy encoding/decoding step corresponding to S505, S601, S704, and S801 will be collectively described.

Hereinafter, each step in FIGS. 5 and 6 will be described in detail below.

First, the step (S501, S602) of deriving the motion vector candidates will be described in detail.

The motion vector candidates of a current block may include at least one of a spatial motion vector candidate and a temporal motion vector candidate, or both.

The temporal motion vector of the current block may be derived from a reconstructed block adjacent to the current block. For example, a motion vector of a reconstructed block adjacent to the current block may be determined as the spatial motion vector candidate of the current block.

Figure 9:
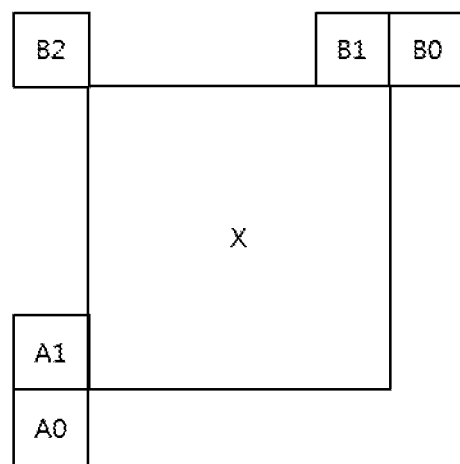
FIG. 9 is a diagram illustrating an exemplary method of deriving a spatial motion vector candidate of a current block.

FIG. 9 is a diagram illustrating an example of deriving a spatial motion vector candidate of a current block.

Referring to FIG. 9, spatial motion vector candidates of a current block may be derived from neighboring blocks adjacent to a current block X. The neighboring blocks adjacent to the current block X includes at least one of a block B1 adjacent to an upper end of the current block, a block A1 adjacent to a left end of the current block, a block B0 adjacent to a upper right corner of the current block, a block B2 adjacent to an upper left corner of the current block, and a block A0 adjacent to a lower left corner of the current block. The neighboring blocks adjacent to the current block may have a square shape or a non-square shape. When one of the neighboring blocks adjacent to the current block has a motion vector, the motion vector of the neighboring block may be determined as the spatial motion vector candidate of the current block. Whether a neighboring block has a motion vector or whether the motion vector of the neighboring block can be used as the spatial motion vector candidate of the current block may be determined based on a determination of whether a neighboring block exists or whether the neighboring block has been encoded through an inter-prediction process. A determination of whether a certain neighboring block has a motion vector or whether the motion vector of the neighboring block can be used as the spatial motion vector candidate of the current block may be performed in a predetermined order. For example, as illustrated in FIG. 9, availability determination of the motion vector may be performed in the order of the blocks A0, A1, B0, B1, and B2.

When a reference picture of the current block and a reference picture of a neighboring block having a motion vector are different from each other, the motion vector of the neighboring block is scaled and then the scaled motion vector can be used as the spatial motion vector candidate of the current block. The motion vector scaling may be performed based on at least any one of a distance between a current picture and a reference picture of the current block and a distance between the current picture and a reference picture of the neighboring block. Here, the spatial motion vector candidate of the current block may be derived by scaling the motion vector of the neighboring block in accordance with a ratio of the distance between the current picture and the reference picture of the current block and the distance between the current picture and the reference picture of the neighboring block.

However, when a reference picture index of the current block and a reference picture index of the neighboring block having a motion vector are different, the scaled motion vector of the neighboring block may be determined as the spatial motion vector candidate of the current block. Even in this case, the scaling may be performed based on at least one of the distance between the current picture and the reference picture of the current block and the distance between the current picture and the reference picture of the neighboring block.

In regards to the scaling, the motion vector of the neighboring block may be scaled based on a reference picture indicated by a reference picture index having a predefined value, and the scaled motion vector may be determined as the spatial motion vector candidate of the current block. The predefined value may be zero or a positive integer. For example, the spatial motion vector candidate of the current block may be derived by scaling the motion vector of the neighboring block based on a ratio of the distance between a current picture and a reference picture of the current block, which is indicated by a reference picture index having a predefined value and the distance between the current picture and a reference picture of the neighboring block, which is indicated by a reference picture index having a predefined value.

Alternatively, the spatial motion vector candidate of the current block may be derived based on at least one of coding parameters of the current block.

The temporal motion vector candidates of the current block may be derived from reconstructed blocks included in a co-located picture of the current picture. The co-located picture is a prior encoded/decoded picture to the current picture and may differ in a temporal order from the current picture.

Figure 10:
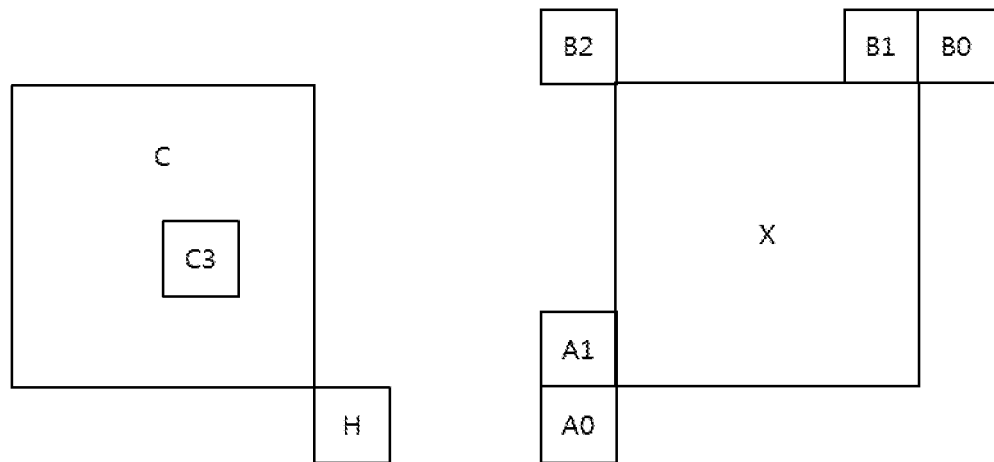
FIG. 10 is a diagram illustrating an exemplary method of deriving a temporal motion vector candidate of a current block.

FIG. 10 is a diagram illustrating an example of deriving the temporal motion vector candidate of the current block.

Referring to FIG. 10, the temporal motion vector candidate of the current block may be derived from a block including an outside position of a block that is located at the spatially same position as the current block X within the co-located picture (also, referred to as collocated picture) of the current picture, or from a block including an inside position of the block that is located spatially at the spatially same position as the current block X. Here, the temporal motion vector candidate may mean a motion vector of a co-located block of the current block. For example, the temporal motion vector candidate of the current block X may be derived from a block H adjacent to a lower right corner of a block C located spatially at the same position as the current block X, or from a block C3 including a center position of the block C. The block H, the block C3, etc. used to derive the temporal motion vector candidates of the current block are referred to as collocated blocks.

Alternatively, at least one of the temporal motion vector candidate, the co-located picture, the co-located block, a prediction list utilization flag, and the reference picture index may be derived based on at least one of the coding parameters.

When the distance between the current picture in which the current block is included and the reference picture of the current block differs from the distance between the co-located picture in which the co-located block is included and the reference picture of the co-located block, the temporal motion vector candidate of the current block may be obtained by scaling the motion vector of the co-located block. Here, the scaling may be performed based on at least one of the distance between the current picture and the reference picture of the current block and the distance between the co-located picture and the reference picture of the co-located block. For example, the temporal motion vector candidate of the current block may be derived by scaling the motion vector of the co-located block in accordance with a ratio of the distance between the current picture and the reference picture of the current block and the distance between the co-located picture and the reference picture of the co-located block.

Next, the step (S502, S603) of generating the motion vector candidate list based on the derived motion vector candidates will be described.

The step of generating the motion vector candidate list may include a process of adding or eliminating a motion vector candidate to or from the motion vector candidate list and a process of adding a combined motion vector candidate to the motion vector candidate list.

First, the process of adding or eliminating a derived motion vector candidate to or from the motion vector candidate list will be described. The encoding apparatus and the decoding apparatus may add the derived motion vector candidates to the motion vector candidate list in the order in which the motion vector candidates are derived.

It is assumed that the motion vector candidate list mvpListLX may mean motion vector candidate lists corresponding to reference picture lists L0, L1, L2, and L3. That is, a motion vector candidate list corresponding to the reference picture list L0 may be denoted by mvpListL0.

In addition to the spatial motion vector candidate and the temporal motion vector candidate, a motion vector having a predetermined value may be added to the motion vector candidate list. For example, when the number of motion vector candidates in a motion vector candidate list is less than the maximum number of motion vector candidates that can be included in the motion vector candidate list, motion vectors having a value of zero may be added to the motion vector candidate list.

Next, the process of adding a combined motion vector candidate to the motion vector candidate list will be described.

When the number of motion vector candidates in a motion vector candidate list is less than the maximum number of motion vector candidates that can be included in the motion vector candidate list, one or more motion vector candidates in the motion vector candidate list are combined to generate one or more combined motion vector candidates and the generated combined motion vector candidates may be added to the motion vector candidate list. For example, at least one or more of the spatial motion vector candidates, the temporal motion vector candidates, and zero motion vector candidates included in the motion vector candidate list are used to generate the combined motion vector candidates, and the generated combined motion vector candidates may be added to the motion vector candidate list.

Alternatively, the combined motion vector candidates may be generated based on at least one of the coding parameters and the combined motion vector candidates generated based on at least one of the coding parameters may be added to the motion vector candidate list.

Next, the step (S503, S604) of selecting a predicted motion vector of the current block from the motion vector candidate list will be described below.

Among the motion vector candidates included in the motion vector candidate list, a motion vector candidate indicated by a motion vector candidate index may be determined as the predicted motion vector of the current block.

The encoding apparatus may calculate a difference between the motion vector and the prediction motion vector of the current block, thereby producing a motion vector difference. The decoding apparatus may generate the motion vector of the current block by adding the predicted motion vector and the motion vector difference.

Here, motion information refinement may be applied to any one of the motion vector candidates included in the motion vector candidate list, the predicted motion vector, or the motion vector calculated by adding the predicted motion vector and the motion vector difference. A detailed description of the motion information refinement will be described later.

The step (S504, S605) of performing motion compensation and the step (S505, S601) of entropy-encoding/decoding information associated with motion compensation, which are shown in FIGS. 5 and 6, and the step (S703, S804) of performing motion compensation and the step (S704, S801) of entropy-encoding/decoding, which are shown in FIGS. 7 and 8, will be collectively described later.

Hereinbelow, each step shown in FIGS. 7 and 8 will be described in detail.

First, the step (S701, 802) of deriving merge candidates will be described.

Merge candidates for the current block may include at least one of a spatial merge candidate, a temporal merge candidate, and an additional merge candidate. Here, the expression "deriving a spatial merge candidate" means a process of deriving a spatial merge candidate and adding the derived merge candidate to a merge candidate list.

Referring to FIG. 9, the spatial merge candidates of the current block may be derived from neighboring blocks adjacent to the current block X. The neighboring blocks adjacent to the current block X may include at least one of a block B1 adjacent to an upper end of the current block, a block A1 adjacent to a left end of the current block, a block B0 adjacent to an upper right corner of the current block, a block B2 adjacent to an upper left corner of the current block, and a block A0 adjacent to a lower left corner of the current block.

In order to derive the spatial merge candidates of the current block, it is determined whether each neighboring block adjacent to the current block can be used for derivation of a spatial merge candidate of the current block. Such a determination is made with respect to the neighboring blocks in a predetermined priority order. For example, availability of the spatial merge candidate may be performed in the order of the blocks A1, B1, B0, A0, and B2 in the example of FIG. 9. The spatial merge candidates determined based on the availability determination order may be sequentially added to the merge candidate list of the current block.

FIG. 11 is a diagram illustrating an example of a process of adding a spatial merge candidate to a merge candidate list.

Referring to FIG. 11, four spatial merge candidates are derived from four neighboring blocks A1, B0, A0, and B2 and the derived spatial merge candidates may be sequentially added to a merge candidate list.

Alternatively, the spatial merge candidates may be derived based on at least one of the coding parameters.

Here, motion information of a spatial merge candidate may include three or more pieces of motion information including L2 motion information and L3 motion information in addition to L0 motion information and L1 motion information. Here, there may be at least one reference picture list, for example, including L0, L1, L2, and L3.

Next, a method of deriving a temporal merge candidate of a current block will be described.

A temporal merge candidate of a current block may be derived from a reconstructed block included in a co-located picture of a current picture. The co-located picture may be a prior encoded/decoded picture to the current picture and may differ in a temporal order from the current picture.

The expression "deriving a temporal merge candidate" means a process of deriving a temporal merge candidate and adding the derived temporal merge candidate to a merge candidate list.

Referring to FIG. 10, a temporal merge candidate of a current block may be derived from a block including a position disposed outside a block located spatially at the same position as the current block X in a co-located picture (also, referred to as a collocated picture) of a current picture, or from a block including a position disposed inside the block located spatially at the same position as the current block X in the co-located picture of the current picture. The term "temporal merge candidate" may mean motion information of a co-located block. For example, a temporal merge candidate of the current block X may be derived from a block H adjacent to a lower right corner of a block C located spatially at the same position as the current block X, or from a block C3 including a center position of the block C. The blocks H, C3, etc. that are used to derive temporal merge candidates of a current block are referred to as co-located blocks (also, referred to as collocated blocks).

When it is possible to derive a temporal merge candidate of the current block from the block H including a position disposed outside the block C, the block H is set as the co-located block of the current block. In this case, a temporal merge candidate of the current block may be derived based on motion information of the block H. Conversely, when it is impossible to derive a temporal merge candidate of the current block from the block H, the block C3 including a position disposed inside the block C may be set as the co-located block of the current block. In this case, a temporal merge candidate of the current block may be derived based on motion information of the block C3. When it is possible to derive any temporal merge candidate of the current block from neither the block H nor the block C3 (for example, both of the blocks H and C3 are intra-encoded blocks), a temporal merge candidate of the current block may not be derived at all, or may be derived from a block other than the blocks H and C3.

Alternatively, for example, a plurality of temporal merge candidates of the current block may be derived from a plurality of blocks included within a co-located picture. That is, a plurality of temporal merge candidates of the current block may be derived from the blocks H, C3, etc.

FIG. 12 is a diagram illustrating an example of a process of adding a temporal merge candidate to a merge candidate list.

Referring to FIG. 12, when one temporal merge candidate is derived from a co-located block located at a position H1, the derived temporal merge candidate may be added to a merge candidate list.

When the distance between a current picture in which a current block is included and a reference picture of the current block differs from the distance between a co-located picture in which a co-located block is included and a reference picture of the co-located block, a motion vector of a temporal merge candidate of the current block may be obtained by scaling a motion vector of the co-located block. Here, the scaling of the motion vector may be performed based on at least one of the distance between the current picture and the reference picture of the current block and the distance between the co-located picture and the reference picture of the co-located block. For example, the motion vector of the temporal merge candidate of the current block may be derived by scaling the motion vector of the co-located block in accordance with a ratio of the distance between the current picture and the reference picture of the current block and the distance between the co-located picture and the reference picture of the co-located block.

In addition, at least one of the temporal merge candidate, the co-located picture, the co-located block, a prediction list utilization flag, and a reference picture index may be derived based on at least one of the coding parameters of the current block, the neighboring block, or the co-located block.

The merge candidate list may be generated by generating at least one merge candidate of the spatial merge candidates and the temporal merge candidates and sequentially adding the derived merged candidates to the merge candidate list in the derived order.

Next, the method of deriving the additional merge candidate of the current block will be described.

The term "additional merge candidate" may mean at least one of a modified spatial merge candidate, a modified temporal merge candidate, a combined merge candidate, and a predetermined merge candidate having a predetermined motion information value. Here, the expression "deriving an additional merge candidate" may mean a process of deriving an additional merge candidate and adding the derived additional merge candidate to a merge candidate list.

The modified spatial merge candidate may mean a merge candidate obtained by modifying at least one item of the motion information of the derived spatial merge candidate.

The modified temporal merge candidate may mean a modified merge candidate obtained by modifying at least one item of the motion information of the derived temporal merge candidate.

The combined merge candidate may mean a merge candidate obtained by combining motion information of at least one of the spatial merge candidate, the temporal merge candidate, the modified spatial merge candidate, the modified temporal merge candidate, the combined merge candidate, and the predetermined merge candidate having a predetermined motion information value, all of which are included in the merge candidate list.

Alternatively, the combined merge candidate may mean a merge candidate derived by combining motion information of at least one of merge candidates: spatial merge candidates and temporal merge candidates that are not included in the merge candidate list but derived from blocks from which at least one of a spatial merge candidate and a temporal merge candidate can be derived; modified spatial merge candidates and modified temporal merge candidates that are derived based on the spatial merge candidates and the temporal merge candidates derived from the blocks; combined merge candidates; and predetermined merge candidates having predetermined motion information values.

Alternatively, the combined merge candidates may be derived using motion information obtained by performing entropy-decoding on a bitstream in a decoder. In this case, motion information used to derive the combined merge candidates may be entropy-encoded into a bitstream in an encoder.

The combined merge candidate may mean a combined bi-prediction merge candidate. The combined bi-prediction merge candidate is a merge candidate using bi-prediction, and it may be a merge candidate having L0 motion information L1 motion information.

The merge candidate having a predetermined motion information value may be a zero merge candidate having a motion vector of (0, 0). The merge candidate having a predetermined motion information value may be set such that it has an identical value in the encoding apparatus and the decoding apparatus.

At least one of the modified spatial merge candidate, the modified temporal merge candidate, the combined merge candidate, and the merge candidate having a predetermined motion information value may be derived or generated based on at least one of the coding parameters of the current block, the neighboring block, or the co-located block. In addition, at least one of the modified spatial merge candidate, the modified temporal merge candidate, the combined merge candidate, and the merge candidate having a predetermined motion information value may be added to a merge candidate list, based on at least one of the coding parameters of the current block, the neighboring block, or the co-located block.

The size of the merge candidate list may be determined based on the coding parameters of the current block, the neighboring block, or the co-located block, and may vary depending on the coding parameters.

Next, the step (S702, S803) of determining motion information of the current block using the generated merge candidate list will be described.

The encoder may select a merge candidate to be used for motion compensation of the current block from the merge candidate list through motion estimation, and encode a merge candidate index merge_idx indicating the determined merge candidate into a bitstream.

In order to generate a prediction bock of the current block, the encoder may select a merge candidate from the merge candidate list by using the merge candidate index and determine motion information of the current block. Then, the encoder may perform motion compensation based on the determined motion information, thereby generating a prediction block of the current block.

The decoder may decode the merge candidate index in the received bitstream and determine the merge candidate included within the merge candidate list and indicated by the merge candidate index. The determined merge candidate may be determined as motion information of the current block. The determined motion information is used for motion compensation of the current block. Here, the term "motion compensation" may have the same meaning as inter-prediction.

Meanwhile, motion information refinement can be applied to any one of the motion information determined based on the merge candidate index or merge candidate included in the merge candidate list. A detailed description of the motion information refinement will be described later.

Next, the step (S504, S605, S703, S804) of performing motion compensation using a motion vector or motion information will be described.

The encoding apparatus and the decoding apparatus may calculate a motion vector of the current block by using a predicted motion vector and a motion vector difference. After the motion vector is calculated, the encoding apparatus and the decoding apparatus may perform inter-prediction or motion compensation using the calculated motion vector (S504, S605).

The encoding apparatus and the decoding apparatus may perform inter-prediction or motion compensation using the determined motion information (S703, S804). Here, the current block may have motion information of the determined merge candidate.

The current block may have one (minimum) to N (maximum) motion vectors in accordance with a prediction direction of the current block. One (minimum) to N (maximum) prediction blocks may be generated using the one to N motion vectors, and a final prediction block may be selected among the generated prediction blocks.

For example, when the current block has one motion vector, a prediction block generated using the motion vector (or motion information) is determined as the final prediction block of the current block.

Meanwhile, when the current block has a plurality of motion vectors (or a plurality of pieces of motion information), a plurality of prediction blocks is generated using the plurality of motion vectors (or the pieces of motion information), and the final prediction block of the current block is determined based on the weighted sum of the plurality of prediction blocks. A plurality of reference pictures respectively including a plurality of prediction blocks respectively indicated by a plurality of motion vectors (or a plurality of pieces of motion information) may be listed in different reference picture lists or in one reference picture list.

For example, a plurality of prediction blocks of the current block may be generated based on at least one of a spatial motion vector candidate, a temporal motion vector candidate, a motion vector having a predetermined value, and a combined motion vector candidate, and then a final prediction block of the current block may be determined based on the weighted sum of the plurality of prediction blocks.

Alternatively, for example, a plurality of prediction blocks of the current block may be generated based on motion vector candidates indicated by a preset motion vector candidate index, and then a final prediction block of the current block may be determined based on the weighted sum of the plurality of prediction blocks. In addition, a plurality of prediction blocks may be generated based on motion vector candidates indicated by indices within a predetermined motion vector candidate index range, and then a final prediction block of the current block may be determined based on the weighted sum of the plurality of prediction blocks.

Weighting factors for the respective prediction blocks may be equally 1/N (here, N is the number of generated prediction blocks). For example, when two prediction blocks are generated, the weighting factor for each prediction block is ½. Similarly, when three prediction blocks are generated, the weighting factor for each prediction block is ⅓. When four prediction blocks are generated, the weighting factor for each prediction block may be ¼. Alternatively, a final prediction block of the current block may be determined in a manner that different weighting factors are applied to the respective prediction blocks.

The weighting factors for the prediction blocks may not be fixed but be variable. The weighting factors for the prediction blocks may not be equal but be different. For example, when two prediction blocks are generated, the weighting factors for the two prediction blocks may be equal as in (½, ½), or may not be equal as in (⅓, ⅔), (¼, ¾), (⅖, ⅗), or (⅜, ⅝). The weighting factors may be positive or negative real values. That is, the values of the weighting factors may include a negative real value as in (−½, 3/2), (−⅓, 4/3), or (−¼, 5/4).

In order to apply variable weighting factors, one or more pieces of weighting factor information for the current block may be signaled through a bitstream. The weighting factor information may be signaled by prediction block by prediction block, or signaled reference picture by reference picture. Alternatively, a plurality of prediction blocks may share one weighting factor.

The encoding apparatus and the decoding apparatus may determine whether to use a predicted motion vector (or predicted motion information) based on the prediction block list utilization flag. For example, for each reference picture list, when the prediction block list utilization flag has a first value of one (1), the encoding apparatus and the decoding apparatus may perform the inter-prediction or the motion compensation of the current block using the predicted motion vector for the current block. However, when the prediction block list utilization flag has a second value of zero (0), the encoding apparatus and the decoding apparatus may not perform the inter-prediction or the motion compensation of the current block using the predicted motion vector for the current block. The first and second values of the prediction block list utilization flag may be inversely set to 0 and 1, respectively. Expression 3 to Expression 5 are examples of a method of generating a final prediction block of the current block when an inter-prediction indicator of the current block is PRED_BI, PRED_TRI, or PRED_QUAD and when a prediction direction for each reference picture list is unidirectional.

$$P\_BI=(WF\_L0*P\_L0+OFFSET\_L0+WF\_L1*P\_L1+OFFSET\_L1+RF)»1 \quad \text{[Expression 1]}$$

$$P\_TRI=(WF\_L0*P\_L0+OFFSET\_L0+WF\_L1*P\_L1+OFFSET\_L1+WF\_L2*P\_L2+OFFSET\_L2+RF)/3 \quad \text{[Expression 2]}$$

$$P\_QUAD=(WF\_L0*P\_L0+OFFSETL0+WF\_L1*P\_L1+OFFSETL1+WF\_L2*P\_L2+OFFSETL2+WF\_L3*P\_L3+OFFSETL3+RF)»2 \quad \text{[Expression 2]}$$

In Expressions 1 to 3, each of P_BI, P_TRI, and P_QUAD represents a final prediction block of the current block, and LX(X=0, 1, 2, 3) represents a reference picture list. WF_LX represents the weighting factor of a prediction block generated using an LX reference picture list. OFFSET_LX represents an offset value for a prediction block generated using the LX reference picture list. P_LX represents a prediction block generated using a motion vector (or motion information) of an LX reference picture list of the current block. RF means a rounding factor and it may be set to 0, a positive integer, or a negative integer. The LX reference picture list may include at least one of a long-term reference picture, a reference picture that has not undergone a deblocking filter, a reference picture that has not undergone sample adaptive offset, a reference picture that has not undergone an adaptive loop filter, a reference picture that has undergone only the deblocking filter and the adaptive offset, a reference picture that has undergone only the deblocking filter and the adaptive loop filter, a reference picture that has undergone the sample adaptive offset and the adaptive loop filter, and a reference picture that has undergone all of the deblocking filter, the sample adaptive offset, and the adaptive loop filter. In this case, the LX reference picture list may be at least any one of an L2 reference picture list and an L3 reference picture list.

Even when there is a plurality of prediction directions for a predetermined reference picture list, a final prediction block of the current block can be obtained based on the weighted sum of the prediction blocks. In this case, the weighting factors for a plurality of prediction blocks derived using one reference picture list may be equal or may be different from each other.

At least either the weighting factors WF_LX or the offsets OFFSET_LX of the plurality of prediction blocks may be coding parameters to be entropy-encoded/decoded. Alternatively, for example, the weighting factor and the offset may be derived from a previously encoded/decoded neighboring block adjacent to the current block. Here, the neighboring block adjacent to the current block may include at least one of a block used to derive a spatial motion vector candidate of the current block and a block used to derive a temporal motion vector candidate of the current block.

Further alternatively, for example, the weighting factor and the offset may be determined based on the display order (picture order count (POC)) of a current picture and the POC of each of the reference pictures. In this case, as the distance between the current picture and the reference picture is increased, the value of the weighting factor or the offset may be decreased. That is, when the current picture and the reference picture are closer to each other, a larger value may be set as the weighting factor or the offset. For example, when the difference between the POC of a current picture and the POC of an L0 reference picture is 2, the value of the weighting factor applied to the prediction blocks generated using the L0 reference picture may be set to ⅓. Meanwhile, when the difference between the POC of the current picture and the POC of the L0 reference picture is 1, the value of the weighting factor applied to the prediction blocks generated using the L0 reference picture may be set to ⅔. As stated above, the weighting factor or the offset may be in inverse proportion to the difference between the display orders (POCs) of the current picture and the reference picture. Alternatively, the weighting factor or the offset may be in proportional to the difference between the display orders (POCs) of the current picture and the reference picture.

Alternatively, for example, at least one of the weighting factor and the offset may be entropy-encoded/decoded based on at least one coding parameter. In addition, the weighted sum of the prediction blocks may be calculated based on at least one coding parameter.

The weighted sum of a plurality of prediction blocks may be applied only to a partial region of the prediction blocks. The partial region may be a boundary region adjacent to the boundary of each prediction block. In order to apply the weighted sum only to the partial region as stated above, the weighted sum may be calculated sub-block by sub-block in each prediction block.

In a block having a block size indicated by region information, inter-prediction or motion compensation may be performed for sub-blocks smaller than the block by using the same prediction block or the same final prediction block.

In a block having a block depth indicated by the region information, inter-prediction or motion compensation may be performed for sub-blocks having a block depth deeper than that of the block by using the same prediction block or the same final prediction block.

In addition, when calculating the weighted sum of the prediction blocks through motion vector prediction, the weighted sum may be calculated using at least one of the motion vector candidates included in a motion vector candidate list, and the calculation result may be used as a final prediction block of the current block.

For example, prediction blocks may be generated using only spatial motion vector candidates, the weighted sum of the prediction blocks may be calculated, and the calculated weighted sum may be used as a final prediction block of the current block.

For example, prediction blocks may be generated using spatial motion vector candidates and temporal motion vector candidates, the weighted sum of the prediction blocks may be calculated, and the calculated weighted sum may be used as a final prediction block of the current block.

For example, prediction blocks may be generated using only combined motion vector candidates, the weighted sum of the prediction blocks may be calculated, and the calculated weighted sum may be used as a final prediction block of the current block.

For example, prediction blocks may be generated using only motion vector candidates indicated by specific indices, the weighted sum of the prediction blocks may be calculated, and the calculated weighted sum may be used as a final prediction block of the current block.

For example, prediction blocks may be generated using only motion vector candidates indicated by indices within a predetermined index range, the weighted sum of the prediction blocks may be calculated, and the calculated weighted sum may be used as a final prediction block of the current block.

When the weighted sum of prediction blocks is calculated using a merge mode, the weighted sum may be calculated using at least one merge candidate among merge candidates included in a merge candidate list, and the calculation result may be used as a final prediction block of the current block.

For example, prediction blocks may be generated using only spatial merge candidates, the weighted sum of the prediction blocks may be calculated, and the calculated weighted sum may be used as a final prediction block of the current block.

For example, prediction blocks may be generated using spatial merge candidates and temporal merge candidates, the weighted sum of the prediction blocks may be calculated, and the calculated weighted sum may be used as a final prediction block of the current block.

For example, prediction blocks may be generated using only combined merge candidates, the weighted sum of the prediction blocks may be generated, and the calculated weighted sum may be used as a final prediction block of the current block.

For example, prediction blocks may be generated using only merge candidates indicated by specific indices, the weighted sum of the prediction blocks may be generated, and the calculated weighted sum may be used as a final prediction block of the current block.

For example, prediction blocks may be generated using only merge candidates indicated by indices within a predetermined index range, the weighted sum of the prediction blocks may be calculated, and the calculated weighted sum may be used as a final prediction block of the current block.

In the encoder and the decoder, motion compensation may be performed using a motion vector or motion information of the current block. At this time, a final prediction block that is the result of the motion compensation may be determined using at least one prediction block. Here, the current block may mean at least one of a current coding block and a current prediction block.

A final prediction block of the current block may be generated by performing overlapped block motion compensation on a boundary region of the current block.

The boundary region of the current block may be a region that is disposed within the current block and is adjacent to the boundary between the current block and a neighboring block of the current block. The boundary region of the current block may include at least one of an upper boundary region, a left boundary region, a lower boundary region, a right boundary region, an upper right corner region, a lower right corner region, an upper left corner region, and a lower left corner region. The boundary region of the current block may be a region corresponding to a portion of a prediction block of the current block.

The overlapped block motion compensation may mean a process of performing motion compensation by calculating the weighted sum of a prediction block corresponding to a boundary region of the current block and a prediction block generated using motion information of an encoded/decoded block adjacent to the current block.

The calculation of the weighted sum may be performed sub-block by sub-block by dividing the current block into a plurality of sub-blocks. That is, the motion compensation of the current block may be performed using motion information of encoded/decoded sub-blocks adjacent to the current block, sub-block by sub-block. The sub-block may mean a lower-level block of the current block.

In addition, in the calculation of the weighted sum, first prediction blocks generated for respective sub-blocks of a current block using motion information of the current block, and second prediction blocks generated using motion information of neighboring sub-blocks spatially adjacent to the current block may be used. In this case, the expression "using motion information" means "deriving motion information". The first prediction block may mean a prediction block generated by using motion information of an encoding/decoding target sub-block within a current block. The second prediction block may be a prediction block generated by using motion information of a neighboring sub-block spatially adjacent to the encoding/decoding target sub-block within the current block.

A final prediction block of the current block may be generated using the weighted sum of the first prediction block and the second prediction block. That is, the overlapped block motion compensation is to find a final prediction block of the current block using motion information of the current block and motion information of another block.

In addition, when at least one of advanced motion vector prediction (AMVP) mode, merge mode, affine motion compensation mode, decoder-side motion vector derivation mode, adaptive motion vector resolution mode, local illumination compensation mode, bi-directional optical flow mode is used, the current block may be divided into a plurality of sub-blocks and overlapped block motion compensation may be performed sub-block by sub-block.

When the merge mode is used for motion compensation, the overlapped block motion compensation may be performed on at least one of an advanced temporal motion vector predictor (ATMVP) candidate and a spatial-temporal motion vector predictor (STMVP) candidate.

Next, the process (S505, S601, S704, S801) of performing entropy-encoding/entropy-decoding on information associated with motion compensation will be described.

The encoding apparatus may entropy-encode information associated with motion compensation into a bitstream, and the decoding apparatus may decode the information associated with motion compensation included in the bitstream. The information associated with motion compensation, which is a target of entropy-encoding or entropy-decoding, may include at least one of an inter-prediction indicator inter_pred_idc, reference picture indices ref_idx_l0, ref_idx_l1, ref_idx_l2, and ref_idx_l3, motion vector candidate indices mvp_l0_idx, mvp_l1_idx, mvp_l2_idx, and mvp_l3_idx, a motion vector difference, skip mode used/unused information cu_skip_flag, merge mode used/unused information merge_flag, merge index information merge_index, weighting factors wf_l0, wf_l1, wf_l2, and wf_l3, and offset values offset_l0, offset_l1, offset_l2, and offset_l3.

The inter-prediction indicator may mean a prediction direction of the inter-prediction, the number of prediction directions, or both, when the current block is encoded/decoded through the inter-prediction. For example, the inter-prediction indicator may indicate unidirectional prediction or multi-directional prediction such as bi-direction prediction, tri-directional prediction, and quadri-directional prediction. The inter-prediction indicator may indicate the number of reference pictures used for generation of prediction blocks of the current block. Alternatively, one reference picture may be used for multiple directions of prediction. In this case, M reference pictures are used to perform prediction of N directions (wherein, N>M). The inter-prediction indicator also may mean the number of prediction blocks used for inter-prediction or motion compensation for the current block.

The reference picture indicator may indicate one direction PRED_LX, two directions PRED_BI, three directions PRED_TRI, four directions PRED_QUAD, or more directions in accordance with the number of prediction directions of the current block.

The prediction list utilization flag of a certain reference picture list indicates whether a prediction block is generated using the reference picture list.

For example, when the prediction list utilization flag of a certain reference picture list has a first value of one (1), it means that prediction blocks are generated using the reference picture list. When the prediction list utilization flag has a second value of zero (0), it means that prediction blocks are not generated using the reference picture list. Here, the first value and the second value of the prediction list utilization flag may be inversely set to 0 and 1, respectively.

That is, when the prediction list utilization flag of a certain reference picture list has the first value, a prediction block of the current block may be generated using motion information corresponding to the reference picture list.

The reference picture index may indicate a specific reference picture that is present in a reference picture list and referred by the current block. For each reference picture list, one or more reference picture indices may be entropy-encoded/decoded. The current block may be motion-compensated using one or more reference picture indices.

The motion vector candidate index indicates a motion vector candidate of the current block, among motion vector candidates included in a motion vector candidate list that is prepared for each reference picture list or each reference picture index. At least one or more motion vector candidate indices may be entropy-encoded/entropy-decoded for each motion vector candidate list. The current block may be motion-compensated using at least one or more motion vector candidate indices.

The motion vector difference represents a difference between a current motion vector and a predicted motion vector. For each of the motion vector candidate lists generated for each reference picture list or each reference picture index for the current block, one or more motion vector differences may be entropy-encoded/entropy-decoded. The current block may be motion-compensated using one or more motion vector differences.

In regards to the skip mode used/unused information cu_skip_flag, when it has a first value of one (1), the skip mode may be used. Conversely, when it has a second value of zero (0), the skip mode may not be used. The motion compensation on the current block may be performed using the skip mode in accordance with the skip mode used/unused information.

In regards to the merge mode used/unused information merge flag, when it has a first value of one (1), the merge mode may be used. Conversely, when it has a second value of zero (0), the merge mode may not be used. The motion compensation on the current block may be performed using the merge mode in accordance with the merge mode used/unused information.

The merge_index information merge_index may mean information indicating a merge candidate within a merge candidate list.

Alternatively, the merge_index information may mean information on a merge_index.

In addition, the merge_index information may indicate a reconstructed block used to derive a merge candidate among reconstructed blocks spatial/temporally adjacent to the current block.

The merge_index information may indicate one or more pieces of motion information that the merge candidate has. For example, when the merge_index information has a first value of zero (0), the merge_index information may indicate a first merge candidate listed as a first entry in the merge candidate list; when the merge_index information has a second value of one (1), the merge_index information may indicate a second merge candidate that is listed as a second entry in the merge candidate list; and when the merge_index information has a third value of two (2), the merge_index information indicate a third merge candidate listed as a third entry in the merge candidate list. Similarly, when the merge_index information has a value from fourth to N-th value, the merge_index information may indicate a merge candidate listed in the merge candidate list at a position in accordance with the order of the values. Here, N may be 0 or a positive integer.

The motion compensation may be performed on the current block using the merge mode based on the merge mode index information.

When two or more prediction blocks are generated during motion compensation of the current block, a final prediction block of the current block may be determined based on the weighted sum of the prediction blocks. When calculating the weighted sum, a weighting factor, an offset, or both may be applied to the respective prediction blocks. Weighted sum factors, for example, a weighting factor and an offset, which are used for calculation of the weighted sum, may be entropy-encoded/entropy-decoded by a number of at least one or by a number corresponding to at least one of the reference picture list, the reference picture, the motion vector candidate index, the motion vector difference, the motion vector, the skip mode used/unused information, the merge mode used/unused information, the merge_index information. In addition, the weighted sum factors for each prediction block may be entropy-encoded/entropy-decoded based on the inter-prediction indicator. The weighted sum factors may include at least one of a weighting factor and an offset.

The information associated motion compensation may be entropy-encoded/entropy-decoded block by block, or may be entropy-encoded/entropy-decoded in units of an an upper level unit. For example, information associated with motion compensation may be entropy-encoded/entropy-decoded block by block, for example, CTU by CTU, CU by CU, or PU by PU. Alternatively, the information associated with motion compensation may be entropy-encoded/entropy-decoded in units of upper level unit, such as a video parameter set, a sequence parameter set, a picture parameter set, an adaption parameter set, or a slice header.

The information associated with motion compensation may be entropy-encoded/entropy-decoded based on a motion compensation information difference indicating a difference between the information associated with motion compensation and a predicted value of the information associated with motion compensation.

Instead of entropy-encoding/entropy-decoding information associated with motion compensation of the current block, information associated with motion compensation of an encoded/decoded block adjacent to the current block may be used as the information associated with motion compensation of the current block.

At least one piece of information associated with motion compensation may be derived based on at least of the coding parameters.

A bitstream may be decoded based on at least one of the coding parameters to generate at least one piece of information associated with motion compensation. Conversely, at least one piece of information associated with the motion compensation may be entropy-encoded based on at least one of the coding parameters into a bitstream.

The at least one piece of information associated with motion compensation may include at least one of a motion vector, a motion vector candidate, a motion vector candidate index, a motion vector difference, a motion vector predicted value, skip mode used/unused information skip_flag, merge mode used/unused information merge_flag, merge_index information merge_index, motion vector resolution information, overlapped block motion compensation information, local illumination compensation information, affine motion compensation information, decoder-side motion vector derivation information, and bi-directional optical flow information. Here, the decoder-side motion vector derivation may mean pattern matched motion vector derivation.

The motion vector resolution information may be information indicating which specific resolution is used for at least one of the motion vector and the motion vector difference. Here, the resolution may mean precision. The specific resolution may be set to at least any one of a 16-pixel (16-pel) unit, a 8-pixel (8-pel) unit, a 4-pixel (4-pel) unit, an integer-pixel (integer-pel) unit, a ½-pixel (½-pel) unit, a ¼-pixel (¼-pel) unit, a ⅛-pixel (⅛-pel) unit, a 1/16-pixel (1/16-pel) unit, a 1/32-pixel (1/32-pel) unit, and a 1/64-pixel (1/64-pel) unit.

The overlapped block motion compensation information may be information indicating whether a motion vector of a neighboring block spatially adjacent to the current block is additionally used to calculate the weighted sum of the prediction block of the current block during motion compensation of the current block.

The local illumination compensation information may be information indicating whether either one of a weighting factor and an offset is applied when generating prediction blocks of the current block. Here, at least one of the weighting factor and the offset may be a value calculated based on a reference block.

The affine motion compensation information may be information indicating whether an affine motion model is used for motion compensation of the current block. Here, the affine motion model may be a model in which one block is divided into a plurality of sub-blocks using a plurality of parameters and motion vectors of the sub-blocks are calculated using a representative motion vector.

The decoder-side motion vector derivation information may be information indicating whether a motion vector required for motion compensation is derived by the decoder and then used in the decoder. Information associated with a motion vector may not be entropy-encoded/entropy-decoded in accordance with the decoder-side motion vector derivation information. When the decoder-side motion vector derivation information indicates that the motion vector is derived by the decoder and then used in the decoder, the information associated with merge mode may be entropy-encoded/entropy-decoded. That is, the decoder-side motion vector derivation information may indicate whether the merge mode is used in the decoder.

The bidirectional optical flow information may be information indicating whether a motion vector is modified pixel by pixel or sub-block by sub-block and then the modified motion vector is used for motion compensation. The motion vector may not be entropy-encoded/entropy-decoded pixel by pixel or sub-block by sub-block, depending on the bidirectional optical flow information. The modification of the motion vector means converting the value of a block-based motion vector into the value of a pixel-based motion vector or the value of a sub-block-based motion vector.

The current block may be motion-compensated based on at least one piece of information associated with motion compensation, and the at least one piece of information associated with motion compensation may be entropy-encoded/entropy-decoded.

When the information associated with motion compensation is entropy-encoded/entropy-decoded, a binarization method such as a truncated Rice binarization method, an K-th order exponential Golomb binarization method, a limited K-th order exponential Golomb binarization method, a fixed length binarization method, a unary binarization method, and a truncated unary binarization method may be used.

When the information associated with motion compensation is entropy-encoded/entropy-decoded, a context model may be determined based on at least one of: information associated with motion information of a neighboring block adjacent to the current block or region information of the neighboring block; previously encoded/decoded information associated with motion compensation or previously encoded/decoded region information; information on the depth of the current block; and information on the size of the current block.

Alternatively, when the information associated with motion compensation is entropy-encoded/entropy-decoded, the entropy-encoding/entropy-decoding may be performed by using at least one of information associated with motion compensation of a neighboring block, previously encoded/decoded information associated with motion compensation, information on the depth of the current block, and information on the size of the current block, as the predicted value of the information associated with motion compensation of the current block.

Hereinafter, a motion information refinement method will be described in detail with reference to FIGS. 13 to 15. Here, the motion information refinement may mean a process of refining at least one piece of motion information. That is, the information to be subjected to the motion information refinement may be at least one piece of the motion information including a motion vector, a reference picture index, a reference picture, an inter-picture prediction indicator, a prediction list utilization flag, a weighting factor, an offset, etc. The motion information refinement means that the value of at least one of the motion vector, the reference picture index, the reference picture, the inter-picture prediction indicator, the prediction list utilization flag, the weighting factor, and the offset is refined.

The information to be subjected to the motion information refinement may be information such as at least one parameter of various coding parameters. In this case, the motion information refinement means that the value of information such as at least one parameter of the coding parameters is refined.

Through the motion information refinement, refined motion information is produced. The refined motion information resulting from the motion information refinement can be used for motion compensation (S504 in FIG. 5, S605 in FIG. 6, S703 in FIG. 7, and S804 in FIG. 8) of a current block to be encoded/decoded (hereinafter, also referred to as an encoding/decoding target block).

In regards to timing for performing the motion information refinement, the motion information refinement may be performed before performing the motion compensation. That is, before performing the motion compensation on an encoding/decoding target block, the motion information refinement is first performed to produce refined motion information, and then the motion compensation will be performed with the produced refined motion information.

For example, for an AMVP mode, the motion information refinement may be performed in the step of determining a motion vector (S503 in FIG. 5, and S604 in FIG. 6). In this case, the motion information refinement may be applied to any one information type among a motion vector candidate included in a motion vector candidate list, a predicted motion vector, and a motion vector calculated by adding the predicted motion vector and a motion vector difference.

For example, for a merge mode, the motion information refinement may be performed in the step of determining the motion information (S702 in FIG. 7, and S803 in FIG. 8). In this case, the motion information refinement may be applied to either a merge candidate included in a merge candidate list or motion information that is extracted from the merge candidate list on the basis of merge candidate indexes.

On the other hand, even for a skip mode, the motion information refinement may be performed. In this case, the motion information refinement may be applied to either a skip candidate included in a skip candidate list or motion information extracted from the skip candidate list on the basis of skip indexes.

In regards to timing for performing the motion information refinement, the motion information refinement may be performed during execution of the motion compensation (S504 in FIG. 5, S605 in FIG. 6, S703 in FIG. 7, and S804 in FIG. 8). That is, while performing the motion compensation on the encoding/decoding target block, the motion information refinement is performed to produce refined motion information, and the motion compensation is performed with the refined motion information.

For example, an encoder/decoder may generate a prediction block on the basis the motion information determined in the motion vector determination step or the motion information determination step (S503 in FIG. 5, S604 in FIG. 6, S702 in FIG. 7, and S803 in FIG. 8), and may generate refined motion information by performing the motion information refinement by using the generated prediction block. Here, the encoder/decoder may generate a final prediction block using the refined motion information.

The motion information may be refined according to the same rule at the encoder side and the decoder side. Since the motion information is refined according to the same rule at the encoder side and the decoder side, "information on the use of the motion information refinement" (hereinafter, referred to as motion information refinement utilization information) may not be entropy encoded/decoded.

Hereinafter, bilateral template matching, which is an exemplary motion information refinement method, will be described with reference to FIGS. 13 to 15, as an image decoding method according to one embodiment.

The bilateral template matching is a method of refining a motion vector among the multiple pieces of motion information. It is possible to refine at least one of the two motion vectors for bidirectional prediction through the bilateral template matching. Here, a bilateral template means a prediction block obtained by calculating the weighted sum of prediction blocks generated using two motion vectors in a bidirectional prediction process. The term "bidirectional prediction" means predictions in two directions-forwards and backwards directions.

Specifically, when the bilateral template matching is performed on the bidirectional prediction blocks, at least one of a first motion vector corresponding to a reference picture list 0 and a second motion vector corresponding to a reference picture list 1 may be refined. At this time, the refined motion vector may have a different motion vector value from the original motion vector.

Figure 13:
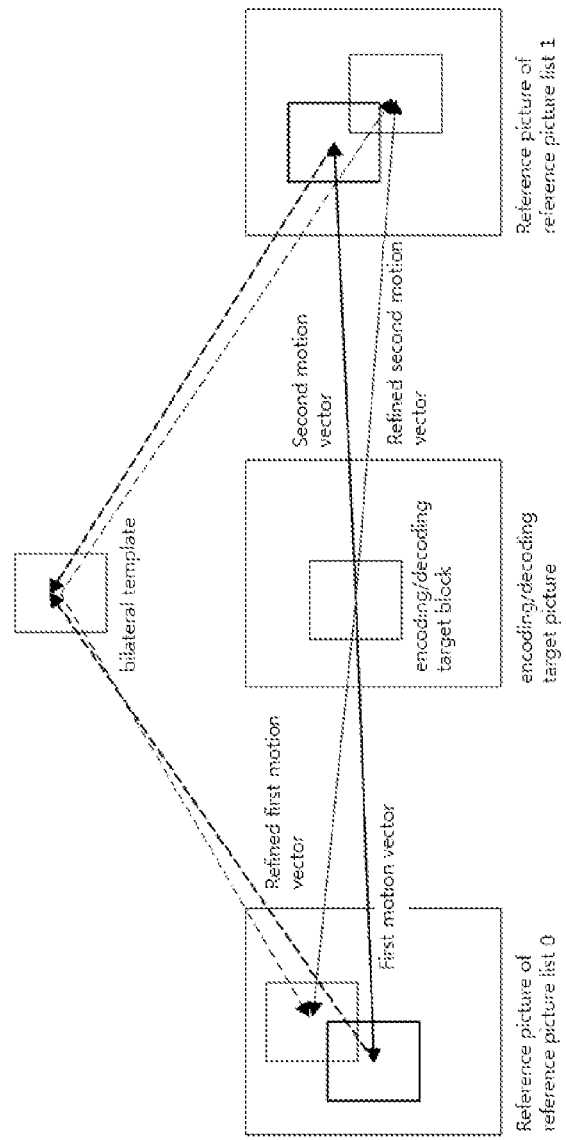
FIG. 13 is a diagram illustrating a method of performing bilateral template matching.

FIG. 13 is a diagram for the describing bilateral template matching.

Referring to FIG. 13, the bilateral template matching includes (1) generating a bilateral template using an initial motion vector, (b) comparing samples of the bilateral template and reconstructed samples of a reference picture to refine the motion vector.

(1) Generation of Bilateral Template

The encoder/decoder may generate a bilateral template using a prediction block generated using a first motion vector corresponding to a reference picture list 0 and a prediction block generated using a second motion vector corresponding to a reference picture list 1. The encoder/ decoder may generate a bilateral template using a prediction block generated using a first motion vector corresponding to the reference picture list 0 and a prediction block generated using a second motion vector corresponding to the reference picture list 0. The encoder/decoder may generate a bilateral template using a prediction block generated using a first motion vector corresponding to the reference picture list 1 and a prediction block generated using a second motion vector corresponding to the reference picture list 1. Here, the bilateral template may be generated by calculating the weighted sum of the prediction blocks, and the weighting factors used for calculation the weighted sum may be 0.5:0.5.

The motion vector used in the process of generating the bilateral template is referred to as an initial motion vector. The initial motion vector may mean a motion vector calculated by using at least one motion information derivation method such as a merge mode, an AMVP mode, and a skip mode.

(2) Refinement of Motion Vector

The encoder/decoder may refine the motion vectors corresponding to the respective reference picture lists by comparing values of samples in the bilateral template and values of reconstructed samples in the reference picture.

It is possible to determine a motion vector indicating an in-reference position (i.e., a position within a reference picture) of the reference picture list 0, which has a value with a minimum distortion value with respect to a value of the corresponding position in the bilateral template, as a refined first motion vector. It is possible to determine a motion vector indicating an in-reference position of the reference picture list 1, which has a value with a minimum distortion with respect to the corresponding position in the bilateral template, as a refined second motion vector.

Specifically, when the distortion value (difference) between the value of the region in the reference picture, which is indicated by the initial first motion vector, and the value of the corresponding region in the bilateral template is larger than the distortion value between the value of the region in the reference picture, which is indicated by the refined first motion vector, and the value of the corresponding region in the bilateral template, the first motion vector may be refined. Similarly, when the distortion value between the value of the region in the reference picture, which is indicated by the initial second motion vector, and the value of the corresponding region in the bilateral template is larger than the distortion value between the value of the region in the reference picture, which is indicated by the refined second motion vector, and the value of the corresponding region in the bilateral template, the second motion vector may be refined.

When comparing the values of the samples (target samples) in the bilateral template and the values of the reconstructed samples (reference samples) in the reference picture, the encoder/decoder calculates an inter-sample distortion value by using a distortion calculation method such as sum of absolute difference (SAD), sum of absolute transformed difference (SATD), sum of squared error (SSE), mean of squared error (MSE) or mean removed SAD (MR-SAD). In this way, the encoder/decoder determines a motion vector indicating a reference sample position exhibiting a minimum distortion value respect to the corresponding target sample position, as a refined motion vector. In this case, the distortion value may be calculated for at least one of the luminance and chrominance components.

When the SAD value of the in-reference region indicated by the initial first motion vector and the in-reference region indicated by the initial second motion vector is greater than a predetermined value, the bidirectional template matching may be performed to refine the initial first motion vector and the initial second motion vector. On the contrary, when the SAD value of the in-reference region indicated by the initial first motion vector and the in-reference region indicated by the initial second motion vector is less than the predetermined value, the bidirectional template matching may not be performed.

In the case of performing bidirectional prediction, when the value of the initial first motion vector corresponding to a first prediction direction (e.g., L0 prediction direction) is equal to the value of the refined first motion vector resulting from the motion information refinement, the motion information refinement may not be performed on the initial second motion vector corresponding to a second direction (e.g., L1 prediction direction).

On the other hand, the bidirectional template matching may be recursively performed.

Specifically, after generating a second bilateral template using the refined first motion vector and the refined second motion vector, another bilateral template matching may be performed with the second bilateral template to secondarily refine the primarily refined first motion vector and the primarily refined second motion vector. In this case, the secondary refinement based on bidirectional template matching may be iteratively performed up to M times. Here, M is a positive integer (e.g., 2), and it may be a fixed value which is preset in the encoder/decoder or a variable value encoded and signaled by the encoder. Alternatively, M may be determined based on the size of the encoding/decoding target block.

For example, when the height or width of the encoding/decoding target block is less than 8, M may be set to 2.

For example, when the height or width of the encoding/decoding target block is 8, M may be set to 2.

For example, when the size of the encoding/decoding target block is 8 in width and 16 in height, or vice versa, M may be set to 4.

Except for the above cases, M may be set to 8. In this case, four times of bilateral template matching can be performed for the first reference picture (e.g., L0 reference picture) and four times of bilateral template matching can be performed for the second reference picture (e.g., L1 reference picture).

On the other hand, in a case where the bidirectional template matching is recursively performed on a sub-pixel basis, the bidirectional template matching also may be recursively performed on an integer-pixel basis.

The refined motion vectors generated through the bidirectional template matching can be used for the motion compensation of the encoding/decoding target block instead of the initial motion vector. The bidirectional template matching may be performed according to the same rule at the encoder side and the decoder side.

In the bilateral template matching, only a restricted region within the reference picture may be searched to find a refined motion vector.

Figure 14:
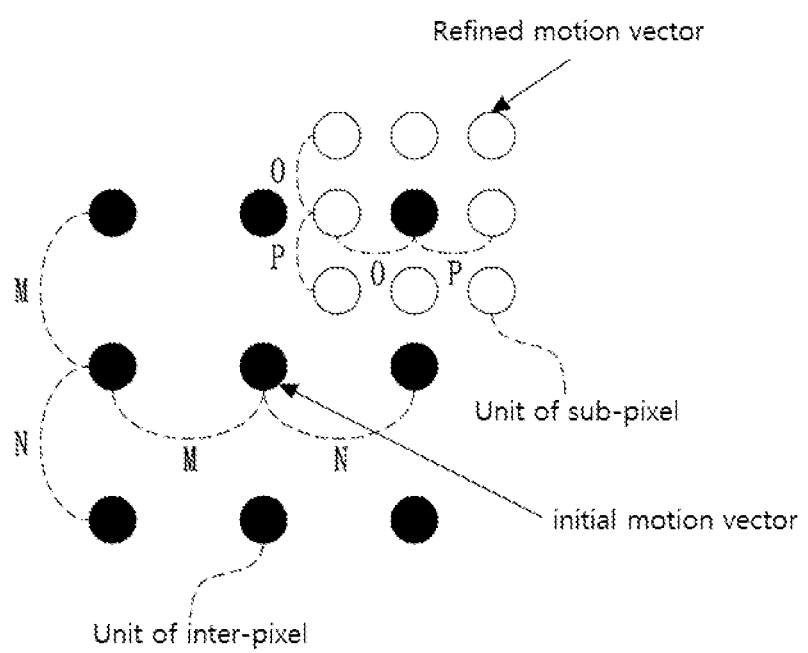
FIGS. 14 and 15 are diagrams illustrating a search range within which searching for a refined motion vector is performed using bilateral template matching.
Figure 15:
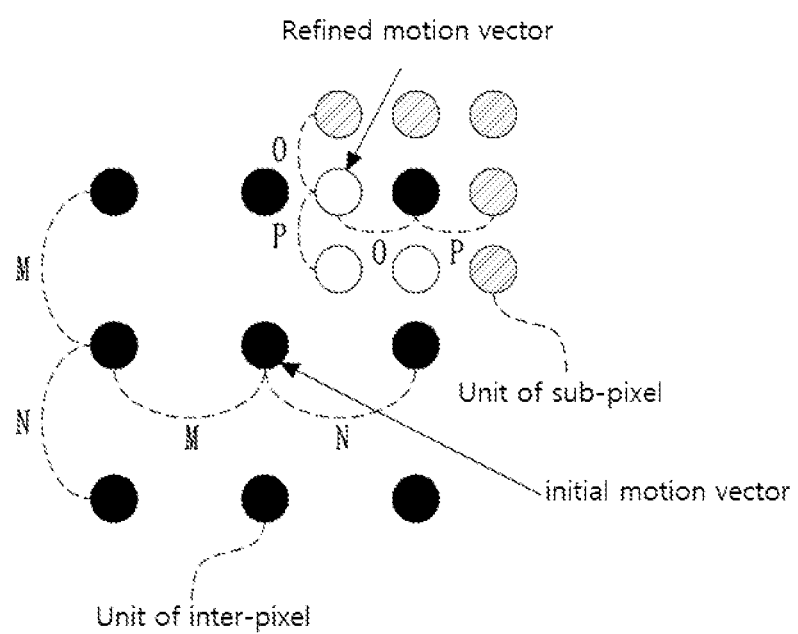

FIGS. 14 and 15 are diagrams illustrating regions (hereinafter referred to as search ranges) which are searched to find refined motion vectors during the bidirectional template matching.

Referring to FIG. 14, the search range may be determined on an integer-pixel basis, for example, a range of −M to +N pixels in horizontal and vertical directions. Here, M and N are positive integers.

Alternatively, the search range may be determined on a sub-pixel basis, for example, a range of −O to +P sub-pixels in horizontal and vertical directions. Here, O and P may be fractional numbers. For example, the unit of the sub-pixel may mean ½-pixel, ¼-pixel, ⅛-pixel, ¹/₁₆-pixel, ¹/₃₂-pixel, or the like. In addition, O and P representing sub-pixels may have positive integer values.

When the encoder/decoder searches for a refined motion vector on a sub-pixel basis, a region including neighboring sub-pixels spatially adjacent to a certain integer-pixel indicated by an integer-pixel motion vector may be the search range. FIG. 14 illustrates an example in which the unit of the sub-pixel is ½-pixel.

In addition, a sub-pixel-based search range may be restricted to reduce a memory access bandwidth. For example, the sub-pixel-based search range may be restricted to only the sub-pixels disposed inside an integer-pixel-based search region.

FIG. 15 is a diagram illustrating a method of restricting the search range of the sub-pixels to fall within an integer-pixel-based search range.

Referring to FIG. 15, sub-pixels represented by hatched dots are not included in the integer-pixel-based search range within which searching for a refined motion vector is performed on an integer-pixel basis. In this case, the sub-pixel-based search range may be restricted such that the sub-pixels outside the inter-pixel-based search range are not searched when finding a refined motion vector. That is, the restriction of the sub-pixel-based search range may be imposed such that only the sub-pixels represented by unhatched dots are searched to find a refined motion vector. In this case, it is not necessary to fetch the information of the integer-pixel for generation of the hatched sub-pixels, resulting in reduction in the memory access bandwidth.

On the other hand, the integer-pixel-based search range may include at least one of a center point, an upper point, a lower point, a left point, and a right point.

Here, based on the distortion values of the upper point, lower point, left point, and right point, at least one point may be further searched. Here, the at least one point may be at least one of an upper left point, a lower left point, an upper right point and a lower right point. In this case, the sub-pixel-based search range may be set to least at one of the center point, the upper point, the lower point, the left point, the right point, the upper left point, the lower left point, the upper right point and the lower right point. For example, the sub-pixel-based search range may be set to the center point, the upper point, the lower point, the left point, and the right point.

The shape of the search range around the pixel indicated by the initial motion vector may be a two-dimensional diagram such as a square shape, a rectangular shape, a diamond (rhombus) shape, or a cross shape. The search range may have a fixed shape predefined in the encoder/decoder, or a variable shape specified by information encoded and signaled by the encoder.

In addition, a motion vector value range may be limited for at least one of the initial motion vector and the refined motion vector so that the search range will not extend beyond the boundary of the picture by a certain distance or more. The range restriction of the motion vector value can be implemented through clipping.

In this case, the range of the motion vector values may be determined to fall within a predetermined range preset in the encoder and the decoder. Here, the predetermined range may mean a critical value limiting a motion vector value, and the critical value may be determined by at least one of a minimum value and a maximum value. Meanwhile, the motion vector value range may be a variable range that is encoded and signaled by the encoder.

On the other hand, at least one of the integer-pixel-based search range and the sub-pixel-based search range may be limited such that it does not extend beyond the boundary of a picture by a certain distance or more.

On the other hand, only after the motion information refinement is performed on an integer-pixel basis, the motion information refinement on a sub-pixel basis can be allowed.

When using the bilateral template matching, the motion vector on the decoder side can be improved without transmission of additional syntax elements. On the other hand, the bilateral template matching may be used for a bidirectional prediction merge mode or a decoder motion vector derivation mode.

According to one embodiment, the bidirectional template matching may be performed when the current block does not correspond to at least one of a unidirectional prediction merge candidate, a local illumination compensation mode, an affine motion compensation mode, and a sub-CU merge mode.

Hereinafter, a motion-refined mode related to the motion information refinement will be described. Here, the motion-refined mode may mean a prediction mode for deriving the motion information used for the inter-picture prediction. For example, the motion-refined mode may be a kind of merge mode which is performed based on the motion information refinement using the bilateral template matching described above.

With the motion-refined mode, a region having a zero motion or a small motion in a picture can be effectively coded.

The motion-refined mode is a motion information derivation scheme based on the motion information refinement described above, and the motion information refinement methods described above can be applied to the motion refinement mode.

On the other hand, whether or not the motion-refined mode is available or whether or not the motion-refined mode is applicable may be determined based on information signaled through a bit stream. The information may be signaled for unit by unit, wherein the unit may be a video, a sequence, a picture, a slice, a tile, a coding tree unit (CTU), a coding unit (CU), a prediction unit (PU), a transformation unit (TU), or a block. Whether or not the motion-refined mode is available may mean whether or not the motion-refined mode is available for the corresponding unit described above. Whether or not the motion-refined mode is applicable may mean whether or not the motion-refined mode is applicable for the corresponding unit.

The motion refinement mode may include the steps of (1) deriving motion information and (b) generating refined motion information by performing the motion information refinement on the derived motion information. Here, the motion information refinement method may include the above-described bilateral template matching. The refined motion information resulting from performing a motion-refined mode may be used for motion compensation of the current block to be encoded/decoded (also referred to as the encoding/decoding target block).

Meanwhile, the motion information that can be refined through the motion-refined mode may include at least one of a motion vector, a reference picture, an inter-picture indicator, a reference picture index, a prediction list utilization flag, a weighting factor, and an offset.

(1) Derivation of Motion Information

In the motion-refined mode, motion information may be derived from at least one information type among motion information of spatially adjacent neighboring blocks, motion information of temporally adjacent neighboring blocks, predefined motion information, and motion information that most frequently occurs within a reference picture. Here, the derived motion information may be recorded as a motion refinement candidate in a list of motion-refined modes (motion-refined mode list). The motion information derived from the motion information of the spatially adjacent neighboring blocks is referred to as a spatial motion refinement candidate, and the motion information derived from the motion information of temporally adjacent neighboring blocks is referred to as a temporal motion refinement candidate.

Hereinafter, a method of deriving a motion vector which is a piece of the motion information will be described in detail.

In the motion-refined mode, a motion vector may be derived from among the motion vectors of spatially adjacent neighboring blocks, the motion vectors of temporally adjacent neighboring blocks, predefined motion vectors, and motion vectors that most frequently occurs in a reference picture.

A. Spatially Adjacent Neighboring Block

In the motion-refined mode, a motion vector may be derived from the motion vector of at least one of the spatially adjacent neighboring blocks. Here, the spatially adjacent neighboring blocks may include neighboring blocks illustrated in FIG. 9.

In the motion-refined mode, a motion vector may be derived from among the motion vectors of the neighboring blocks that satisfy at least one of the following conditions among the spatially adjacent neighboring blocks:
  a block where a coding block flag is 0 (that is, a block with no residual signal),
  a block corresponding to the merge skip mode,
  a block where a motion vector difference value is zero (for example, MVD=(0,0)) among neighboring blocks spatially adjacent to the current block,
  a block corresponding to the merge mode,
  a block where an inter-picture prediction indicator is PRED_LX (X is one number of integers including zero), and
  a block where an inter-picture prediction indicator is any one of PRED_BI, PRED_TRI, and PRED_QUAD.

In the motion-refined mode, a motion vector may be derived from the motion vectors of at least one of the spatial skip/merge candidates.

For example, when the reference picture of a spatial skip/merge candidate is not identical to the reference picture of an encoding/decoding target block (i.e., when the picture order counts (POCs) of the reference pictures of the spatial skip/merge candidate and the encoding/decoding target block differ), a motion vector may be derived by scaling a motion vector that is derived from among the motion vectors of the spatially adjacent neighboring blocks, on the basis of the POC values of the pictures.

B. Temporally Adjacent Neighboring Block

In the motion-refined mode, a motion vector may be derived from the motion vectors of at least one of the temporally adjacent neighboring blocks. Here, the temporally adjacent neighboring blocks may include a co-located block within a reference picture and a co-located block within a co-located picture.

Here, the co-located block in the reference picture may be at least one of the following blocks:
  a co-located block in the reference picture (hereinafter, referred to as a co-located reference block), which corresponds to an upper left position (0, 0) of the encoding/decoding target block,
  a co-located block in the reference picture (C3 in FIG. 10),
  a co-located block in the reference picture (C1 in FIG. 10), and
  a co-located block in the reference picture (H in FIG. 10).

Here, the co-located block in the co-located picture may be at least one of the following blocks:
  a co-located block in the co-located picture, which corresponds to an upper left position (0, 0) of the encoding/decoding target block,
  a co-located block in the co-located picture (C3 in FIG. 10),
  a co-located block in the co-located picture (C1 in FIG. 10), and
  a co-located block in the co-located picture (H in FIG. 10).

In the motion-refined mode, a motion vector may be derived from the motion vectors of the neighboring blocks that satisfy at least one of the following conditions among the temporally adjacent neighboring blocks:
  a block where a coding block flag is 0 (that is, a block with no residual signal) among blocks disposed inside and outside the co-located block,
  a block corresponding to the merge skip mode among blocks disposed inside and outside the co-located block,
  a block where a motion vector difference value is zero (for example, MVD=(0,0)) among blocks disposed inside and outside the co-located block,
  a block corresponding to the merge mode among blocks disposed inside and outside the co-located block,
  a block where an inter-picture prediction indicator is PRED_LX (X is a number of integers, including zero), and
  a block where the inter-picture prediction indicator is any one of PRED_BI, PRED_TRI, and PRED_QUAD among blocks disposed inside and outside the co-located block.

In the motion-refined mode, a motion vector may be derived from the motion vectors of at least one of the temporal skip/merge candidates.

For example, when the reference picture of a temporal skip/merge candidate or a co-located picture is not identical to the reference picture of an encoding/decoding target block (i.e., when the picture order counts (POC) of the reference pictures thereof differ from each other), a motion vector may be derived by scaling a motion vector that is derived from among the motion vectors of the temporally adjacent neighboring blocks, on the basis of the POC values of the pictures.

Meanwhile, reference picture indexes indicating the reference picture and the co-located picture including the temporally adjacent neighboring blocks may be derived from among the reference picture indexes of the spatially adjacent neighboring blocks.

C. Predefined Motion Vector

In the motion-refined mode, a zero motion vector having a value of (0, 0) may be derived as a motion vector.

D. Motion Vector That Most Frequently Occurs in Reference Picture

In the motion-refined mode, a motion vector which most frequently occurs in the reference picture may be derived.

In this case, the motion vectors are arranged in order of frequency occurring in the reference picture, and a maximum of L motion vectors may be derived according to the frequency order. Wherein, L is a positive integer. In this case, L may be a fixed value preset in the encoder/decoder, or may be a variable value encoded and signaled by the encoder.

On the other hand, in the motion-refined mode, a motion vector may be derived in order of items A, B, C, and D. In this case, the derivation of the motion vector may be repeatedly performed until a total of M motion vectors are derived. In addition, the motion vectors may be derived sequentially in the order described above. When a newly derived motion vector already exists among the previously derived motion vectors, the derivation of the motion vector is stopped, and thus a maximum of M motion vectors can be derived and used for the motion-refined mode. Here, M is a positive integer, and it may be a fixed value which is preset in the encoder/decoder or a variable value encoded and signaled by the encoder. Here, when there are a plurality of spatially adjacent neighboring blocks, the motion vectors of the bidirectional prediction may be preferentially derived and inserted into the motion-refined mode list, and the motion vectors of the unidirectional prediction may be then derived and inserted.

The motion vector derivation in the motion-refined mode described above may be performed according to the procedure described below.

For example, the motion vectors may be derived in the sequence of the motion vectors of the spatially adjacent neighboring blocks, the motion vectors of the temporally adjacent neighboring blocks, and the zero motion vectors (0,0).

As another example, the motion vectors may be derived in the sequence of the motion vectors of the temporally adjacent neighboring blocks, the motion vectors of the spatially adjacent neighboring blocks, and the zero motion vectors (0,0).

Here, the motion vectors of the spatially adjacent neighboring blocks may be derived in the sequence of deriving the spatial skip/merge candidates, and the motion vectors of the temporally adjacent neighboring blocks may be derived in the sequence of deriving the temporal skip/merge candidates.

In the motion-refined mode, the derived motion vectors can be used only when the motion vectors derived by the above method does not have a value of (0, 0).

For example, when the bidirectional prediction is used in the motion-refined mode, the derived motion vectors can be used only when both of the derived first and second motion vectors do not have a value of (0, 0).

When the N-direction prediction (N is an integer of 2 or more) is used in the motion-refined mode, the derived motion vectors can be used only when none of the derived N motion vectors have a value of (0, 0).

In the N-direction prediction (N is an integer of 2 or more), among the derived motion vectors, only some motion vectors that do not have a value of (0, 0) can be used for the motion vectors in the motion-refined mode.

Meanwhile, when the bidirectional prediction is used in the motion-refined mode, when the derived first motion vector and the derived second motion vector are not equal to each other, either or both of the derived first motion vector and the derived second motion vector can be used in the motion-refined mode.

On the other hand, when the inter-picture prediction indicators of the spatially adjacent neighboring blocks or the temporally adjacent neighboring blocks indicate at least one of the bidirectional prediction, the tri-directional prediction, and the quad-directional prediction, the derived motion vectors can be used in the motion-refined mode. That is, when the inter-picture prediction indicators of the spatially adjacent neighboring blocks or the temporally adjacent neighboring blocks do not indicate the unidirectional prediction, the derived motion vectors can be used in the motion vector-refined mode.

When the inter-picture prediction indicators of the spatially adjacent neighboring blocks or the temporally adjacent neighboring blocks indicate the unidirectional prediction, the inter-picture prediction indicators are changed to indicate the bidirectional prediction, and the sign of the motion vector of the unidirectional prediction is reversely changed. Thus, a motion vector for a unidirectional prediction which has a direction opposite to the direction of the former (original) unidirectional prediction is derived and used as a motion vector in the motion-refined mode.

For example, when the inter-picture prediction indicators of the spatially adjacent neighboring blocks or the temporally adjacent neighboring blocks indicate L0 unidirectional prediction and the motion vector thereof is (−4, 6), the inter-picture prediction indicators are changed to indicate the bidirectional prediction and a motion vector (4, −6) is derived for L1 direction prediction. Thus, two motion vectors (−4, 6) and (4, −6) can be used the motion vectors in the motion-refined mode. In this case, as the reference picture for the L1 unidirectional prediction, a reference picture that is positioned a first distance away from the current picture may be determined, in which the first distance is the same as or proportional to a second distance which is the distance between the current picture and the reference picture for the L0 unidirectional prediction.

In the motion-refined mode in which N-directional prediction (N is an integer of 2 or more) is used, when the number of derived motion vectors is not N, one or more motion vectors can be further derived from one or more previously derived motion vectors to obtain a total of N motion vectors. Specifically, the motion vector(s) can be generated by scaling the previously derived motion vector(s) which are generated on the basis of the picture order counts of the current picture and/or the reference picture.

For example, when the bidirectional prediction is used in the motion-refined mode and only the previously derived first motion vector is present, the first motion vector is scaled based on the reference picture in the reference picture list 1 to generate a second motion vector. Thus, the previously derived first motion vector and the newly generated second motion vector may be used as the motion vectors in the motion-refined mode.

Alternatively, when the bidirectional prediction is used in the motion-refined mode and only the previously derived second motion vector is present, the second motion vector is scaled based on the reference picture in the reference picture list 0 to generate a first motion vector. Thus, the previously derived second motion vector and the newly generated first motion vector may be used as the motion vectors in the motion-refined mode.

Hereinafter, a method of deriving a reference picture which is also a piece of the motion information will be described in detail.

In the motion-refined mode, a reference picture may be derived using at least one of the methods described below.

For example, as a reference picture to be used in the motion-refined mode, a reference picture having a reference picture index of 0 may be derived from among the reference pictures included the reference picture list 0 and the reference pictures included in the reference picture list 1. Among the reference pictures included within the reference picture list 0 and the reference picture list 1, there may be a case where the reference pictures having a reference picture index of 0 respectively in the reference picture list 0 and the reference picture list 1 may be identical to each other. In this case, among the reference pictures included within the reference picture list 1, a reference picture which is not identical to the reference picture having a reference picture index of 0 and included within the reference picture list 0 can be derived as a reference picture to be used in the motion-refined mode. Among the reference pictures included within the reference picture list 0 and the reference picture list 1, there may be a case where the reference pictures having a reference picture index of 0 respectively in the reference picture list 0 and the reference picture list 1 are identical to each other. In this case, among the reference pictures included within the reference picture list 0, a reference picture which is not identical to the reference picture having a reference picture index of 0 and included within the reference picture list 1 can be derived as a reference picture to be used in the motion-refined mode.

To derive the reference pictures to be used in the motion-refined mode as described above, the reference picture index 0 can be used. However, the present invention is not limited to thereto, and reference pictures to be used in the motion-refined mode can be derived using a reference picture index having a value other than zero.

A method of deriving a reference picture to be used in the motion-refined mode by using a reference picture index of other than zero will be described below.

A median value of reference picture indexes for at least one of positions A1, B1, B0, A0, and B2, respectively spatially adjacent to the encoding/decoding target block may be used as a reference picture index to be used. Here, instead of the median value, various statistical values such as a minimum value, a maximum value, an average value, a weighted average value, and a mode value may be used. The reference picture indicated by the determined reference picture index can be derived as a reference picture to be used in the motion-refined mode. At this time, the reference picture index can be determined using the above method for each of the reference picture lists.

When a block exists only at the position A1 and the block has an inter-picture prediction mode, the reference picture of the block can be determined by only the reference picture index of the position A1.

When a block exists only at the position B1 and the block has an inter-picture prediction mode, the reference picture of the block can be determined by only the reference picture index of the position B1.

When a block exists only at the position B0 and the block has an inter-picture prediction mode, the reference picture of the block can be determined by only the reference picture index of the position B0.

When a block exists only at the position A0 and the block has an inter-picture prediction mode, the reference picture of the block can be determined by only the reference picture index of the position A0.

When a block exists only at the position B2 and the block has an inter-picture prediction mode, the reference picture of the block can be determined by only the reference picture index of the position B2.

A refined reference picture may be produced by applying the motion information refinement method to the reference picture derived by using the above-described method, and the refined reference picture may be used as the reference picture of the motion-refined mode.

In the embodiment described above, two reference picture lists are assumed to be used. However, the number of reference picture lists is not limited thereto. There may be N reference picture lists. In this case, N may an integer of 2 or more. When there are N reference picture lists, derivation of reference pictures can be performed in a similar way to the above described method, i.e., based on the determination of the identity of reference pictures in the N reference picture lists. That is, N reference pictures different from each other can be derived.

In another embodiment, among reference pictures included in a reference picture list i (i=0, . . . , or N, wherein N is an integer of 0 or greater), a reference picture having the smallest difference in picture order count (POC) with respect to the encoding/decoding target picture can be derived as a reference picture of the motion-refined mode.

Alternatively, among the reference pictures included in a reference picture list i (i=0, . . . , or N, wherein N is an integer of 1 or more), a reference picture having the smallest difference in picture order count (POC) with respect to the encoding/decoding target picture and/or the smallest temporal layer identifier value can be derived as a reference picture of the motion-refined mode.

Further alternatively, reference pictures of spatially adjacent neighboring blocks can be derived as reference pictures of the motion-refined mode.

Further alternatively, reference pictures of temporally adjacent neighboring blocks can be derived as reference pictures of the motion-refined mode.

Further alternatively, one or more reference pictures selected from among skip/merge candidates can be derived as reference pictures of the motion-refined mode.

Further alternatively, all or part of the reference pictures included in the reference picture lists are subjected to motion information refinement processing and then a reference picture exhibiting the minimum distortion value after the refinement processing is derived as a reference picture of the motion-refined mode.

Hereinafter, a method of deriving an inter-picture prediction indicator which is a piece of the motion information will be described in detail.

In the motion-refined mode, an inter-picture prediction indicator can be derived using at least one of the methods described below.

For example, in the motion-refined mode, the inter-picture prediction indicator can be fixed to one of a unidirectional prediction, a bidirectional prediction, a three-directional prediction, a four-directional prediction, and an N-directional prediction.

As another example, the inter-picture prediction indicator of a spatially adjacent neighboring block can be derived as the inter-picture prediction indicator to be used in the motion-refined mode.

As a further example, the inter-picture prediction indicator of a temporally adjacent neighboring block can be derived as the inter-picture prediction indicator to be used in the motion-refined mode.

As a further example, one or more inter-picture prediction indicators among skip/merge candidates can be derived as the inter-picture prediction indicator(s) to be used in the motion-refined mode.

As a further example, it is possible to derive the inter-picture prediction indicator according to the number of available reference pictures among the reference pictures derived by the above-described method, as the inter-picture prediction indicator to be used in the motion compensation mode. Specifically, when there is only one available reference picture, the inter-picture prediction indicator can be derived by using the unidirectional prediction. Specifically, when there are two available reference pictures, the inter-picture prediction indicator can be derived by using the bidirectional prediction.

A refined inter-picture prediction indicator is produced by applying the motion information refinement method to the previously derived inter-picture prediction indicator, and the refined inter-picture prediction indicator can be used as an inter-picture prediction indicator in the motion correction mode of the current block.

(2) Refinement of Motion Information

The encoder/decoder produces a refined reference picture by performing the motion information refinement on the reference picture derived by using the above-described method, and uses the refined motion information as motion information in the motion-refined mode. Specifically, motion compensation may be performed by generating a prediction block using at least one of a refined motion vector, a refined reference picture, and a refined inter-picture prediction indicator. Similarly, the encoder/decoder produces at least one of a refined reference picture index, a refined prediction list utilization flag, a refined weighting factor, and a refined offset by applying the motion information refinement method to at least one of the previously derived reference picture index, the previously derived prediction list utilization flag, the previously derived weighting factor, and the previously derived offset, creates a prediction block by using at least one of the refined reference picture index, the refined prediction list utilization flag, the refined weighting factor, and the refined offset. Here, the motion information refinement method may include the above-described bilateral template matching. In this case, a final prediction block is obtained by calculating a weighted sum of the prediction blocks based on the picture order count between the encoding/decoding target picture and each of the reference pictures, and thus motion compensation can be performed.

On the other hand, when the motion information refinement processing is applied to the previously derived motion vector, the previously derived motion vector can be used to determine an initial motion search position. A refined motion vector can be determined based on the initial motion search position.

The encoder/decoder may perform motion information refinement on a maximum of M pieces of derived motion information. In this case, M may be a fixed value preset in the encoder/decoder, or may be a variable value encoded and signaled by the encoder. For example, at least one piece of motion information among a first piece, a second piece, . . . , and an N-th piece of motion information may be refined. In this case, M is an integer equal to or greater than 4.

Further, without applying the motion information refinement to all or part of the previously derived motion information, the previously derived motion information can be used as the motion information of the motion-refined mode. Specifically, motion compensation may be performed by generating a prediction block using at least one of the derived motion vector, the derived reference picture, and the derived inter-picture prediction indicator.

Meanwhile, the motion information refinement (for example, bilateral template matching) may be selectively used in the motion-refined mode.

According to one embodiment, the motion information refinement is performed when the current block is not related to at least one of a unidirectional prediction merge candidate, a local illumination compensation mode, an affine motion compensation mode, and a sub-CU merge mode.

The motion information refinement may be performed when only one of a first difference value and a second difference value is a negative integer value, in which the first difference value is a POC difference ($POC_{ref0}-POC_{curr}$) between a first reference picture corresponding to a first prediction direction (for example, L0 prediction direction) and the encoding/decoding target picture, and the second difference value is a POC difference ($POC_{ref1}-POC_{curr}$) between a second reference picture corresponding to a second prediction direction (for example, L1 prediction direction) and the encoding/decoding target picture.

Further, the motion information refinement may be performed when the first prediction direction and the second prediction direction are different from each other.

The encoder/decoder may perform the bilateral template matching on at least one piece of the derived motion information resulting through the above-described method, generates a prediction block using one piece of the motion information, which has a minimum distortion, and performs motion compensation. At this time, the at least one piece of the motion information may include at least one of L0 motion information and L1 motion information.

The encoder/decoder may perform the bilateral template matching on one or more candidates existing in a skip candidate list or a merge candidate list, generate a prediction block using one candidate having a minimum distortion, and perform motion compensation.

The encoder/decoder may perform the bilateral template matching on at least one piece of the derived motion information resulting through the above-described method, generate M prediction blocks by using M pieces of motion information, each of which has a minimum distortion, calculate a weighted sum of the M prediction blocks, and uses the weighted sum as a final prediction block of the encoding/decoding target block. Here, M may be a positive integer, and may be equal to or greater than 2.

The encoder/decoder may perform the bilateral template matching on one or more candidates included in a skip candidate list or a merge candidate list, generate M prediction blocks using M candidates, each having a minimum distortion, calculate a weighted sum of the M prediction blocks, and use the weighted sum as a final prediction block of the encoding/decoding target block. Here, M may be a positive integer, and may be equal to or greater than 2.

The encoder/decoder may perform entropy encoding/decoding of a skip index or a merge_index for unidirectional prediction candidates existing in a skip candidate list or a merge candidate list, and may produce prediction blocks by using at least one candidate having a minimum distortion among M or more bidirectional prediction candidates, thereby performing motion compensation. In this case, one flag or one index is entropy encoded/decoded to indicate M or more bidirectional prediction candidates. That is, each of the unidirectional prediction candidates is allocated a skip index or a merge_index, but the M or more bidirectional prediction candidates are collectively allocated one skip index or one merge_index. For the M or more bidirectional prediction candidates, a skip index or merge_index may not be allocated to each of the bidirectional prediction candidates because at least one candidate representing the minimum distortion can be determined by using the bidirectional template matching.

Whether to use the motion-refined mode or not may be determined according to the motion-refined mode utilization information. Here, the motion-refined mode utilization information may be entropy encoded/decoded with at least one of the flag information and the index information.

The encoding/decoding of the motion-refined mode utilization information may be performed based on the value of the skip flag. The encoding/decoding timing of the motion-refined mode utilization information may be determined based on the encoding/decoding timing of the skip flag. For example, the motion-refined mode utilization information may be entropy encoded/decoded when the skip flag is 1 (i.e., when the skip mode is used). In this case, the motion-refined mode utilization information may be entropy encoded/decoded after the skip flag is entropy encoded/decoded.

Conversely, the encoding/decoding of the skip flag may be performed based on the value of the motion-refined mode utilization information. For example, the skip flag may be entropy encoded/decoded when the motion-refined mode utilization information is 1 (i.e., when the motion-refined mode is used). In this case, the motion-refined mode utilization information may be entropy encoded/decoded before the skip flag is entropy encoded/decoded.

The encoding/decoding of the motion-refined mode utilization information may be performed based on the value of the merge flag. The encoding/decoding timing of the motion-refined mode utilization information may be determined based on the encoding/decoding timing of the merge flag. For example, the motion-refined mode utilization information may be entropy encoded/decoded when the merge flag is 1 (i.e., when the merge mode is used). In this case, the motion-refined mode utilization information may be entropy encoded/decoded after the merge flag is entropy encoded/decoded.

Conversely, the encoding/decoding of the merge flag may be performed based on the value of the motion-refined mode utilization information. For example, the merge flag may be entropy encoded/decoded when the motion-refined mode utilization information is 1 (i.e., when the motion-refined mode is used). In this case, the motion-refined mode utilization information may be entropy encoded/decoded before the merge flag is entropy encoded/decoded.

The encoding/decoding of the motion-refined mode utilization information may be performed based on a specific motion compensation mode. For example, the motion-refined mode utilization information may be entropy encoded/decoded when an affine motion compensation mode is not used.

The encoding/decoding of the decoder motion vector derivation mode flag may be performed based on the value of the motion-refined mode utilization information. That is, the decoder-side motion vector derivation mode flag may be entropy encoded/decoded when the motion-refined mode utilization information is 0 (i.e., when the motion-refined mode is not used).

Further, the motion-refined mode utilization information may be encoded/decoded based on the motion-refined mode utilization information of one or more neighboring blocks of the encoding/decoding target block. For example, the one or more neighboring blocks of the encoding/decoding target block may include one or more spatially adjacent blocks and/or temporally adjacent blocks. The one or more spatially adjacent blocks may include a block positioned on the left of the encoding/decoding target block and/or a block positioned above the encoding/decoding target block.

In addition, when the motion-refined mode utilization information is not signaled, the motion-refined mode utilization information may be derived based on the motion-refined mode utilization information of one or more neighboring blocks of the encoding/decoding target block. The one or more neighboring blocks of the encoding/decoding target block may include one or more spatially adjacent neighboring blocks and/or temporally adjacent neighboring blocks. The one or more spatially adjacent blocks may include a block positioned on the left of the encoding/decoding target block and/or a block positioned above the encoding/decoding target block.

The motion-refined mode utilization information may be entropy encoded/decoded when at least one of the blocks spatially adjacent to the encoding/decoding target block used the skip mode.

The motion-refined mode utilization information may be entropy encoded/decoded when at least one of the blocks spatially adjacent to the encoding/decoding target block used the merge mode.

The motion-refined mode utilization information may be entropy encoded/decoded when at least one of the blocks spatially adjacent to the encoding/decoding target block used the inter-picture mode.

The motion-refined mode utilization information may be entropy encoded/decoded using a bypass mode.

When the motion-refined mode is used with the skip mode, the residual signal may not be entropy encoded/decoded.

When the motion-refined mode is used with the merge mode, the residual signal may be entropy encoded/decoded.

In the motion-refined mode, only a part of the residual signal may be entropy encoded/decoded for use. In this case, the part of the residual signal may be a DC quantization level (DC transform coefficient).

When the motion-refined mode is used, information other than the motion-refined mode utilization information may not be entropy encoded/decoded. Here, the other information may be at least one piece of the information regarding the motion compensation.

Hereinabove, the motion-refined mode related to the motion information refinement will be described. Hereinafter, a motion refinement candidate derived in a motion refinement mode will be described.

The motion refinement candidate may be motion information including at least one of a derived motion vector, a derived reference picture, and a derived inter-picture prediction indicator which are derived through the motion refinement mode. The encoder/decoder may add the motion refinement candidate to the skip candidate list or the merge candidate list as a skip candidate or a merge candidate in the skip mode or the merge mode.

An embodiment in which the motion refinement candidate is added to the skip/merge candidate list will be described below.

When a skip/merge candidate the same as the motion refinement candidate exists in the skip/merge candidate list, the motion refinement candidate may not be added to the skip/merge candidate list. When a motion refinement candidate the same as a skip/merge candidate exists in the skip/merge candidate list, the skip/merge candidate may not be added to the skip/merge candidate list.

The motion refinement candidate may be derived earlier than the spatial skip/merge candidate and added to the skip/merge candidate list.

The motion refinement candidate may be derived earlier than the spatial skip/merge candidate that is derived from a specific position, and then may be added to the skip/merge candidate list. Here, the specific position may be at least one of the positions A1, B1, B0, A0, and B2 in FIG. 10.

Further, the motion refinement candidate may be derived earlier than at least one of a temporal skip/merge candidate, a combined merge candidate, and a merge candidate having a predetermined motion information value, and may be added to the skip/merge candidate list.

The encoder/decoder may determine motion information including at least one of a refined motion vector, a refined reference picture, and a refined inter-picture prediction indicator which are obtained through the motion information refinement of the motion refinement mode, as a motion refinement candidate. The encoder/decoder may add the motion refinement candidate to the skip candidate list or the merge candidate list as a skip candidate or a merge candidate, in the skip mode or the merge mode.

Instead of the skip mode, the motion refinement mode may be used. That is, a picture may be encoded/decoded by using the motion refinement mode instead of the skip mode. Instead of the merge mode, the motion refinement mode may be used. That is, a picture may be encoded/decoded by using the motion refinement mode instead of the merge mode.

At least one of an overlapped block motion compensation mode, a local illumination compensation mode, and a bidirectional optical flow mode may be applied to a final prediction block generated using the motion refinement mode.

Further, in the motion-refined mode, the motion information refinement method may be applied to only one piece of or a part of motion information, without generating a list of motion information candidates.

Hereinafter, a condition for performing motion information refinement in a motion-refined mode (MRM) will be described.

Whether to perform the motion information refinement or not may be determined based on the picture order count (POC) of the reference picture of a motion vector.

For example, the motion information refinement method may be performed when there are both of the following motion vectors: a first motion vector indicating a reference picture having a picture order count smaller than that of the encoding/decoding target picture; and a second motion vector indicating a reference picture having a picture order count larger than that of the encoding/decoding target picture.

Alternatively, the motion information refinement method may be performed when there are two motion vectors indicating reference pictures having a smaller picture order count than the encoding/decoding target picture.

Further alternatively, the motion information refinement method may be performed when there are two motion vectors indicating reference pictures having a larger picture order count than the encoding/decoding target picture.

The motion information correction may be performed on the encoding/decoding target block when at least one of an affine motion compensation mode, a decoder motion vector derivation mode, and a local illumination compensation mode is not used.

The motion information refinement may be performed when the difference value between the picture order count of the encoding/decoding target picture and the picture order count of a first reference picture or the difference value between the picture order count of the encoding/decoding target picture and the picture order count of a second reference picture is less than N (N is an integer greater than or equal to 0). In this case, the first reference picture may refer to a reference picture indicated by a first motion vector, and the second reference picture may refer to a reference picture indicated by a second motion vector.

The motion information refinement may be performed based on the first motion vector and the second motion vector, which are targets of motion information refinement.

For example, when the first motion vector is the same as the second motion vector and when the reference picture indicated by the first motion vector is identical to the reference picture indicated by the second motion vector, the motion information refinement may not be performed. That is, the motion information refinement may be performed only when the first motion information and the second motion information are different from each other, and/or when the reference pictures indicated by the first motion information and the second motion information are different from each other. Also, when the first motion vector is the same as the second motion vector, the motion information refinement may not be performed. That is, the motion information refinement may be performed only when the first motion vector and the second motion vector are different from each other.

Alternatively, the motion information refinement may be performed only when the reference picture indicated by the first motion vector is identical to the reference picture indicated by the second motion vector. Conversely, the motion information refinement may be performed only when the reference picture indicated by the first motion vector is different from the reference picture indicated by the second motion vector.

As another example, the motion information refinement may be performed on a motion vector whose motion vector value is not (0, 0). Here, the motion information refinement may be performed when the inter-picture prediction indicator indicates bidirectional and when neither the first motion vector nor the second motion vector has a value of (0, 0). Further, the motion information refinement may not be performed when the inter-picture prediction indicator indicates N-direction (N is an integer equal to or greater than 2) and when all or a predetermined number of N motion vectors do not have a value of (0, 0).

The motion information refinement may be performed only when the inter-picture prediction indicator indicates a specific number of directions. For example, the motion information refinement may be performed only when the inter-picture prediction indicator of the skip/merge candidate indicates bidirectional.

The motion information refinement may be performed only when the reference picture index of the reference picture indicated by the first motion vector is 0 and the reference picture index of the reference picture indicated by the second motion vector is 0. Alternatively, the motion information refinement may be performed only when the reference picture indexes of the reference pictures indicated by the respective motion vectors have a specific value.

The motion information refinement may be performed only on at least one of a spatial skip/merge candidate, a temporal skip/merge candidate, a combined skip/merge candidate, and a skip/merge candidate having a predetermined motion information value.

The encoding/decoding target block may be divided into sub-blocks, and the motion information refinement may be performed on a per-sub-block basis.

On the other hand, when the encoding/decoding target block has motion information or a motion vector for each of the sub-blocks, the motion information refinement may be performed on a per-sub-block basis to improve coding efficiency. There may be case that all of the sub-blocks of the encoding/decoding target block have different motion information or vectors or the same motion information or vector. Thus, the motion information refinement may be performed only when all of the sub-blocks of the encoding/decoding target block have different motion information or vectors, or have the same motion information or vector.

When the encoding/decoding target block has motion information or a motion vector on a per-sub-block basis, the motion information refinement may not be performed on the motion information or the motion vector on a per-sub-block basis in order to reduce computational complexity. The motion information refinement may be performed only when all of the sub-blocks of the encoding/decoding target block have the same motion information or vector to reduce computational complexity.

The motion information refinement may be performed either on a per-sample basis or on a per-block basis.

In the case where the encoding/decoding target block is to be encoded using the N-directional prediction such as a three-directional prediction and a four-directional prediction, the motion information refinement may be performed by calculating a template using N motion vectors such as three motion vectors and four motion vectors. In this case, M is an integer equal to or greater than 3.

When the bilateral template matching is used as the motion information refinement method, new motion information may be generated by scaling the previously derived motion information.

For example, when there is only one piece of motion information (i.e., first motion information) or only a first motion vector in a spatially adjacent neighboring block or a temporally adjacent neighboring block, scaling is performed based on the first motion information or the first motion vector to produce second motion information or a second motion vector, and then the motion information refinement may be performed.

Similarly, when there is only one piece of motion information (i.e., second motion information) or only a second motion vector in a spatially adjacent neighboring block or a temporally adjacent neighboring block, scaling is performed based on the second motion information or the second motion vector to produce first motion information or a first motion vector, and then the motion information refinement may be performed.

As another example, when the reference picture indicated by the initial motion vector is different from the reference picture indicated by the refined motion vector candidate, the initial motion vector is scaled based on the picture order count (POC) values of the respective reference pictures to obtain a refined motion vector candidate. Here, the refined motion vector candidate means a motion vector indicating a region within which searching is performed to fine a refined motion vector. To obtain the refined motion vector, the bilateral template matching may be performed by comparing the distortion value of the position indicated by the refined motion vector with the distortion value of the position indicated by the initial motion vector.

On the other hand, a refined motion vector may be calculated by applying the motion information refinement to at least one motion vector among one motion vector of the luminance component and two motion vectors of the chrominance components.

On the other hand, all or part of the reference pictures included in the reference picture lists are subjected to the motion information refinement and then a reference picture exhibiting a minimum distortion value after the refinement processing may be derived as a refined reference picture.

The same conditions under which the motion information refinement is performed may be applied to the motion information refinement for the decoder-side motion vector derivation mode.

Figure 16:
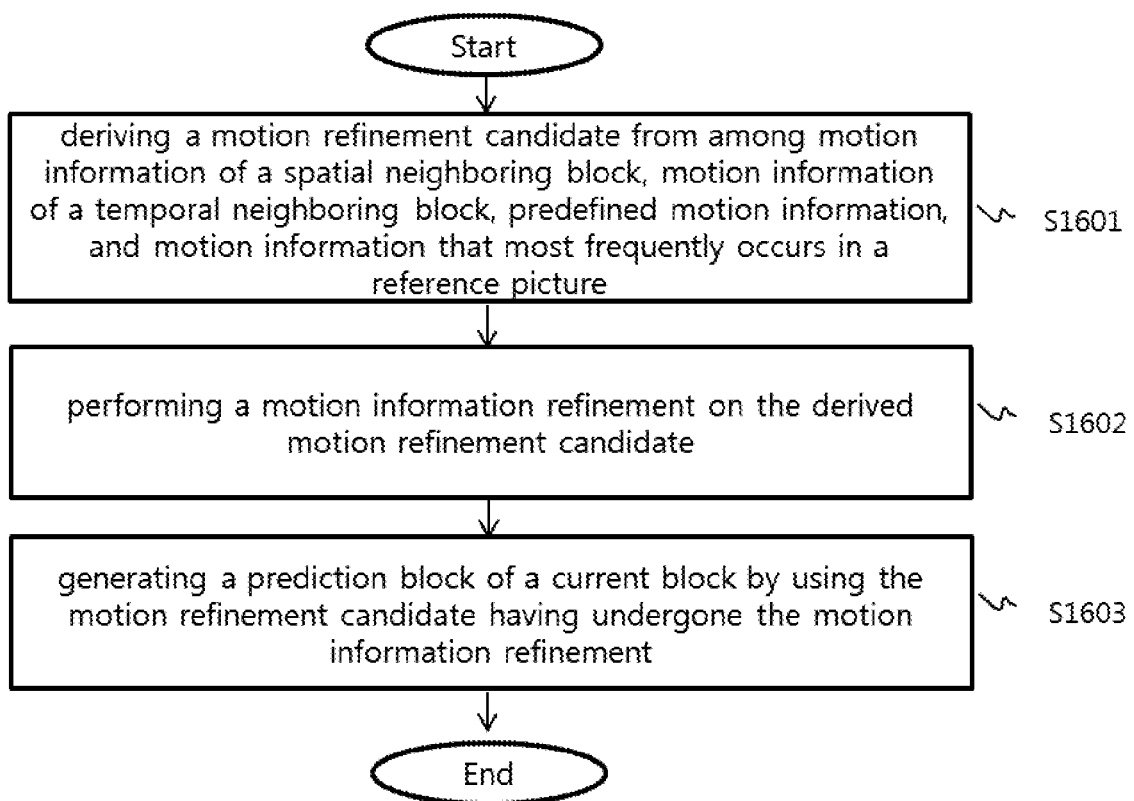
FIG. 16 is a flowchart illustrating an image decoding method according to a further embodiment of the present invention.

FIG. 16 is a flowchart illustrating an image decoding method according to a further embodiment of the present invention.

Referring to FIG. 16, the decoder may derive a motion refinement candidate from at least one piece of information among motion information of spatially adjacent neighboring blocks, motion information of temporally adjacent neighboring blocks, predefined motion information, and motion information that most frequently occurs in a reference picture (S1601).

In this case, motion refinement candidates may be derived in predetermined order: the order of motion information of spatially adjacent neighboring blocks, motion information of temporally adjacent neighboring blocks, predefined motion information, and motion information which occurs with a highest probability within a reference picture. The predetermined order may represent the sequential order of the motion information of spatially adjacent neighboring blocks, motion information of temporally adjacent neighboring blocks, and the predefined motion information. Here, the predefined motion information may include a zero vector.

The temporally adjacent neighboring blocks may be included in reference pictures which are selected based on the reference picture indexes of the spatially adjacent neighboring blocks.

Next, the motion information refinement may be performed on the previously derived motion refinement candidate (S1602).

In this case, the motion information refinement can be performed by applying the bidirectional template matching to the motion vectors existing among the derived motion refinement candidates.

Here, the bilateral template matching may include a step of generating a bilingual template by using a motion vector selected from among the derived motion refinement candidate as an initial motion vector, and a step of refining the initial motion vector by comparing the values of the samples in the bilingual template and the values of the reconstructed reference samples indicated by the initial motion vectors in the reference picture.

Here, the step of refining the initial motion vector may be performed recursively.

The initial motion vector may be a bidirectional prediction motion vector that is not a zero motion vector and is selected from among the derived motion refinement candidates. Here, when there is no bidirectional prediction motion vector that is not a zero vector among the derived motion refinement candidates, the initial motion vector may be set to a zero vector.

On the other hand, the step of refining the initial motion vector includes a step of searching for a motion vector indicating a least distortion region in the reference picture as compared with the corresponding region in the bilateral template and a step of setting the found motion vector as a refined value of the initial motion vector.

Here, the step of searching for a motion vector may be performed within a limited search range in the reference picture.

In this case, the limited search range may be set to a predetermined area that is demarcated on an integer-pixel basis, and the step of searching for the motion vector may be performed on a sub-pixel basis within the predetermined search range that is demarcated on an inter-pixel basis.

On one hand, the bidirectional template matching may be performed on an inter-pixel basis and a sub-pixel basis. In this case, the step of searching for a motion vector may be performed to search for a motion vector on a sub-pixel basis within a predetermined search range that is demarcated on an integer-pixel basis.

Meanwhile, the step of performing the motion information refinement on the derived motion refinement candidate may be performed when the block does not correspond to any one of the unidirectional prediction merge candidate, the local illumination compensation mode, and the affine motion compensation mode.

Next, a prediction block of the encoding/decoding target block (i.e., current block) is generated by using a motion refinement candidate resulting from the motion information refinement (S1603).

The image decoding method may further include a step of decoding the motion-refined mode utilization information, which is performed before Step S1601, and a step of determining a motion-refined mode based on the decoded motion-refined mode utilization information. Only when the current block is determined as corresponding to the motion-refined mode as a result of the determination step, Step S1601 may be performed.

Here, whether to perform the step of decoding the motion-refined mode utilization information may be determined based on the skip flag or the merge flag.

In the case where there are a plurality of spatially adjacent neighboring blocks, the step of deriving the motion refinement candidates may be performed such that the motion information is derived primarily from the spatially adjacent neighboring blocks having the bidirectional predicted motion vector and secondarily from the spatially adjacent neighboring blocks having the unidirectional prediction motion vector.

The image decoding method according to the present invention has been described above. Each of the steps of the image decoding method described above can be performed in the same manner as the image encoding method.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

When a motion vector having at least one of a 16-pel unit, an 8-pel unit, a 4-pel unit, an integer-pel unit, ⅛-pel unit, 1/16-pel unit, 1/32-pel unit and 1/64-pel unit, the above embodiments of the present invention can also be applied. The motion vector may be selectively used for each pixel unit.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention can be applied to an apparatus for encoding/decoding an image.

The invention claimed is:

1. An image decoding method comprising:
generating a merge candidate list of a current block including at least one of motion information of a spatial neighboring block, motion information of a temporal neighboring block and zero motion information;
determining a merge candidate from the merge candidate list;
determining a motion information of the current block by performing a motion information refinement on the determined merge candidate when the motion-refined mode is applied to the current block; and
generating a prediction block of the current block by using the motion information of the current block,
wherein the merge candidate on which motion information refinement is performed is determined as a candidate at a predefined position included in the merge candidate list, and
wherein the candidate at the predetermined position is determined from among candidates of a first position and a second position included in the merge candidate list.

2. The method according to claim 1, wherein the merge candidate includes a motion vector and reference picture information, and
wherein the performing a motion information refinement performs a motion information refinement on a motion vector of the determined merge candidate.

3. The method according to claim 1, wherein the motion information refinement is performed based on a limited region set based on a pixel indicated by a motion vector included in the determined merge candidate.

4. The method according to claim 3, wherein the limited region is a cross shape.

5. The method according to claim 1, further comprising:
decoding motion-refined mode utilization information; and
determining a motion-refined mode based on the decoded motion-refined mode utilization information.

6. The method according to claim 5, wherein the decoding of the motion-refined mode utilization information comprises:
determining whether to decode the motion-refined mode utilization information based on a skip flag or a merge flag.

7. The method according to claim 1, wherein the motion information refinement is performed only on a predetermined number of the merge candidate included in the merge candidate list.

8. An image encoding method comprising:
generating a merge candidate list of a current block including at least one of motion information of a spatial neighboring block, motion information of a temporal neighboring block and zero motion information;
determining a merge candidate from the merge candidate list;
determining a motion information of the current block by performing a motion information refinement on the determined merge candidate when the motion-refined mode is applied to the current block; and
generating a prediction block of the current block by using the motion information of the current block,
wherein the merge candidate on which motion information refinement is performed is determined as a candidate at a predefined position included in the merge candidate list, and
wherein the candidate at the predetermined position is determined from among candidates of a first position and a second position included in the merge candidate list.

9. A non-temporary storage medium containing a bit stream generated through an image encoding method comprising:
generating a merge candidate list of a current block including at least one of motion information of a spatial neighboring block, motion information of a temporal neighboring block and zero motion information;
determining a merge candidate from the merge candidate list;
determining a motion information of the current block by performing a motion information refinement on the determined merge candidate when the motion-refined mode is applied to the current block; and
generating a prediction block of the current block by using the motion information of the current block,
wherein the merge candidate on which motion information refinement is performed is determined as a candidate at a predefined position included in the merge candidate list, and
wherein the candidate at the predetermined position is determined from among candidates of a first position and a second position included in the merge candidate list.

* * * * *